United States Patent
Kayano et al.

(10) Patent No.: US 7,521,016 B2
(45) Date of Patent: Apr. 21, 2009

(54) PRESSURIZED GAS INTRODUCING DEVICE, AND INJECTION MOLDING METHOD FOR MOLDINGS HAVING HOLLOW PORTION

(75) Inventors: Yoshihiro Kayano, Hiratsuka (JP); Akimasa Kaneishi, Hiratsuka (JP); Hiroyuki Imaizumi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 739 days.

(21) Appl. No.: 10/514,315

(22) PCT Filed: Jul. 2, 2003

(86) PCT No.: PCT/JP03/08386

§ 371 (c)(1),
(2), (4) Date: Nov. 15, 2004

(87) PCT Pub. No.: WO2004/005003

PCT Pub. Date: Jan. 15, 2004

(65) Prior Publication Data

US 2005/0226954 A1  Oct. 13, 2005

(30) Foreign Application Priority Data

Jul. 4, 2002  (JP) .............................. 2002-195589

(51) Int. Cl.
   *B29C 45/17*  (2006.01)
(52) U.S. Cl. ...................................... 264/572; 425/130
(58) Field of Classification Search ................. 425/130; 264/572
   See application file for complete search history.

(56) References Cited

U.S. PATENT DOCUMENTS

| 4,824,732 | A |   | 4/1989  | Hendry et al. |
| 5,039,463 | A | * | 8/1991  | Loren ........................ 264/40.3 |
| 5,047,183 | A |   | 9/1991  | Eckardt et al. |
| 5,118,455 | A | * | 6/1992  | Loren ........................ 264/40.3 |
| 5,141,682 | A | * | 8/1992  | Steinbichler et al. ....... 264/40.3 |
| 5,198,240 | A | * | 3/1993  | Baxi ......................... 425/145 |
| 5,252,287 | A | * | 10/1993 | Fries ......................... 264/572 |
| 5,411,685 | A | * | 5/1995  | Burgis ....................... 264/40.3 |
| 5,948,446 | A | * | 9/1999  | Hori .......................... 425/130 |

FOREIGN PATENT DOCUMENTS

| EP | 0 127 961 | 12/1984 |
| EP | 0 310 914 | 4/1989  |
| JP | 2-289327  | 11/1990 |
| JP | 7-32405   | 2/1995  |
| JP | 8-258074  | 10/1996 |
| JP | 11-28736  | 2/1999  |

* cited by examiner

*Primary Examiner*—Robert B Davis
(74) *Attorney, Agent, or Firm*—Wenderoth, Lind & Ponack, L.L.P.

(57) ABSTRACT

An apparatus for introducing a pressurized gas includes a pressurized-gas supply-source, a plurality of measuring tanks, a first pressurized-gas supply-line, pressurized-gas supply valves in the first pressurized-gas supply-line, second pressurized-gas supply-lines and pressurized-gas discharge-control valves disposed in the second pressurized-gas supply-lines. A combination of the measuring tanks is determined on the basis of the amount of a pressurized gas required for forming a hollow portion in a molded article, and the pressurized-gas discharge-control valves disposed in the second pressurized-gas supply-lines are controlled on the basis of the above determination.

15 Claims, 26 Drawing Sheets

SUPPLY OF PRESSURIZED GAS

STANDBY

INTRODUCTION OF PRESSURIZED GAS

COMPLETION

INTRODUCTION OF PRESSURIZED GAS (1)

INTRODUCTION OF PRESSURIZED GAS (2)

INTRODUCTION OF PRESSURIZED GAS

DEPRESSURIZATION

COMPLETION

INTRODUCTION OF PRESSURIZED GAS

COMPLETION

SUPPLY OF PRESSURIZED GAS

STANDBY

INTRODUCTION OF PRESSURIZED GAS

COMPLETION

INTRODUCTION OF PRESSURIZED GAS (1)

INTRODUCTION OF PRESSURIZED GAS (2)

INTRODUCTION OF PRESSURIZED GAS

DEPRESSURIZATION

PRESSURIZED GAS INTRODUCING DEVICE, AND INJECTION MOLDING METHOD FOR MOLDINGS HAVING HOLLOW PORTION

BACKGROUND OF THE INVENTION

1. Field of the Invention

The present invention relates to an apparatus for introducing a pressurized gas and an injection molding method for producing a molded article having a hollow portion with the apparatus for introducing a pressurized gas.

2. Description of Related Art

In a conventional method of introducing a pressurized gas into a molten resin injected into a cavity provided in a mold on the basis of an injection molding method to produce a molded article having a hollow portion (to be sometimes referred to as "gas injection method" hereinafter), the following two methods are known for introducing the pressurized gas into the molten resin injected into the cavity.

In a first method, a gas amount (pressure and volume) required for one operation of injection molding is measured in a cylinder in advance with a piston-type compressor having a piston and the cylinder having a predetermined volume. In the injection molding, the gas measured and accumulated in the cylinder in advance is introduced into a molten resin in a cavity while compressing the gas by means of movement of the piston in the cylinder, to form a hollow portion inside a molded article. Then, the position of the piston is maintained in that state, to maintain the gas pressure within the hollow portion. This method will be called "measuring method" hereinafter. This measuring method is disclosed, for example, in JP-A-60-24913.

In a second method, a gas in a gas source is pressure-increased to a high pressure with a compressor in advance and reserved in a pressure container having a large capacity, and, for injection molding, the gas in the pressure container is introduced into a molten resin in a cavity through a discharge valve or a pressure-regulating valve disposed on the discharge side of the pressure container. This method will be called "constant pressure method" hereinafter. The constant pressure method is disclosed, for example, in JP-A-1-128814.

However, the above prior techniques have the following problems.

(1) Problems of the Measuring Method (1-1) The cylinder has a constant volume. When a hollow portion in a molded article has a large volume, it is sometimes impossible to generate a gas pressure required for forming the desired hollow portion even if a maximum gas amount is measured. In this case, no molded article having a good product quality can be obtained.

(1-2) When the amount of a gas to be introduced into a molten resin is large, it is required to increase the pressure of a gas to be supplied to the cylinder at a measurement time. In many cases, however, a gas cylinder is used as a gas source, so that the consumption efficiency of the gas cylinder is degraded. That is, when the pressure in the gas cylinder decreases, the gas cylinder can be no longer used.

(1-3) When a hollow portion to be formed in a molded article is large, it is required to increase the volume of the cylinder so that the amount of a gas to be introduced into a molten resin may be increased. It is therefore sometimes required to provide gas compression equipments having different capacities depending upon the volumes of the hollow portions.

(1-4) When the volume of a hollow portion to be formed in a molded article is small, part of a measured gas is of no use, which results in poor economic efficiency.

(1-5) The gas is pressure-increased at one compression step, so that the compression ratio is large. It is therefore required to design the piston diameter, the internal diameter of the cylinder and the piston stroke to such sizes necessary for a one-time full operation of injection molding. As a result, the gas compression equipment is caused to increase in size, the sealing structure for a high-pressure gas is complicated, and the cost for manufacturing the gas compression equipment increases. In addition, the energy consumed for operating the piston is large.

(2) Problems of the Constant Pressure Method (2-1) The gas pressure in the pressure container is required to be higher than the pressure of a gas to be loaded into a molten resin in a cavity, so that the energy efficiency is poor.

(2-2) The gas pressure in the pressure container is constantly maintained at a high pressure, so that the pressure container involves danger of explosion.

(2-3) When the gas leaks out of a formed hollow portion after the gas is introduced into a molten resin in a cavity, a large amount of the gas from the pressure container hangs around the mold, so that workers may be endangered. In the gas injection method, further, nitrogen gas is generally used as a gas. When the nitrogen gas concentration in a working atmosphere sharply increases, therefore, lack of oxygen may be caused on workers.

(2-4) It is difficult to stably introduce a constant amount of a gas into a molten resin in a cavity in many cases.

It is therefore an object of the present invention to provide an apparatus for introducing a pressurized gas, which enables reliable introduction of a pressurized gas having a predetermined volume required for forming a hollow portion when a molded article having the hollow portion is produced by injecting a molten resin into a cavity provided in a mold and introducing the pressurized gas into the molten mold in the cavity and which has a simple structure, and an injection molding method for producing a molded article having a hollow portion with the above apparatus for introducing a pressurized gas.

SUMMARY OF THE INVENTION

The apparatus for introducing a pressurized gas according to a first aspect of the present invention for achieving the above object is an apparatus for introducing a pressurized gas for use in an injection molding method in which a molten resin is injected into a cavity provided in a mold and the pressurized gas is introduced into the molten resin in the cavity to produce a molded article having a hollow portion, said apparatus comprising;

(A) a pressurized-gas supply-source, (B) a plurality of measuring tanks, (C) a first pressurized-gas supply-line for supplying the pressurized gas to each measuring tank from the pressurized-gas supply-source, (D) a pressurized-gas supply valve disposed somewhere in the first pressurized-gas supply-line, (E) a second pressurized-gas supply-line for introducing the pressurized gas into the molten resin in the cavity from the measuring tank, and (F) a pressurized-gas discharge-control valve disposed somewhere in the second pressurized-gas supply-line, wherein a combination of the measuring tanks is determined on the basis of the amount of the pressurized gas required for forming the hollow portion in the molded article, and the open/close of the pressurized-gas discharge-control valve disposed in the second pressurized-gas supply-line is controlled on the basis of the determination.

In the apparatus for introducing a pressurized gas according to the first aspect of the present invention, there can be employed a constitution in which a pressure-regulating valve is disposed somewhere in the first pressurized-gas supply-line, and further, for each measuring tank, whereby the pressure of the pressurized gas to be introduced into the molten resin in the cavity can be optimized, and the pressurized gas can be efficiently used. That is, for example, there can be employed a constitution in which a high-pressure pressurized gas is introduced with certain measuring tank(s) in the initial stage of introducing the pressurized gas into the molten resin in the cavity, and after the initial stage, a relatively low-pressure pressurized gas is introduced with other measuring tank(s).

In the apparatus for introducing a pressurized gas according to the first aspect of the present invention, there can be employed a constitution in which a pressurized-gas accumulation tank having a volume greater than the total volume of the measuring tanks is disposed in the first pressurized-gas supply-line between the pressurized-gas supply valve and the pressurized-gas supply-source, whereby the supply of the pressurized gas to the measuring tanks can be more stabilized. In this case, there can be also employed a constitution in which a pressure-regulating valve is disposed somewhere in the first pressurized-gas supply-line between the pressurized-gas accumulation tank and the measuring tank, and further, for each measuring tank, whereby the pressure of the pressurized gas to be introduced into the molten resin in the cavity can be optimized, and the pressurized gas can be efficiently used. That is, for example, there can be employed a constitution in which a high-pressure pressurized gas is introduced with certain measuring tank(s) in the initial stage of introducing the pressurized gas into the molten resin in the cavity, and after the initial stage, a relatively low-pressure pressurized gas is introduced with other measuring tank(s).

In the apparatus for introducing a pressurized gas according to the first aspect of the present invention including these various embodiments, there may can employed a constitution in which a flow-regulating valve is disposed somewhere in the second pressurized-gas supply-line, and further, for each measuring tank, whereby the introduction rate of the pressurized gas to be introduced into the molten resin in the cavity can be optimized. That is, for example, there can be employed a constitution in which the pressurized gas is introduced at a low speed with certain measuring tank(s) in the initial stage of introducing the pressurized gas into the molten resin in the cavity, and after the initial stage, the pressurized gas is introduced at a relatively high speed with other measuring tank(s).

In the apparatus for introducing a pressurized gas according to the first aspect of the present invention including these various embodiments, it is desirable to employ a constitution in which the pressurized-gas discharge-control valve(s) does (do) not come into an open state together with the pressurized-gas supply valve(s) at the same time. In this manner, the pressurized gas having a predetermined pressure can be reliably supplied to each measuring tank.

In the apparatus for introducing a pressurized gas according to the first aspect of the present invention including these various embodiments, the pressurized-gas discharge-control valves may come into an open state at the same time, or may not come into an open state at the same time (that is, the pressurized-gas discharge-control valves are consecutively brought into an open state). In essence, it is sufficient to decide what constitution should be employed, on the basis of the volumes of the measuring tanks, the pressures of the pressurized gases in the measuring tanks, the volume of a hollow portion to be formed, and the like.

The apparatus for introducing a pressurized gas according to a second aspect of the present invention for achieving the above object is an apparatus for introducing a pressurized gas for use in an injection molding method in which a molten resin is injected into a cavity provided in a mold and the pressurized gas is introduced into the molten resin in the cavity to produce a molded article having a hollow portion, said apparatus comprising;

(A) a pressurized-gas supply-source,
(B) a plurality of measuring tanks,
(C) a first pressurized-gas supply-line connected to the pressurized-gas supply-source,
(D) a second pressurized-gas supply-line that is connected to a terminal of the first pressurized-gas supply-line and that is for supplying the pressurized gas to each measuring tank from the pressurized-gas supply-source,
(E) a third pressurized-gas supply-line that is connected to the terminal of the first pressurized-gas supply-line and communicates with the second pressurized-gas supply-line and that is for introducing the pressurized gas into the molten resin in the cavity from the measuring tank,
(F) a pressurized-gas supply valve disposed somewhere in the first pressurized-gas supply-line,
(G) a pressurized-gas supply/discharge-control valve disposed somewhere in the second pressurized-gas supply-line, and
(H) a pressurized-gas discharge valve disposed somewhere in the third pressurized-gas supply-line, wherein a combination of the measuring tanks is determined on the basis of the amount of the pressurized gas required for forming the hollow portion in the molded article, and the open/close of the pressurized-gas supply/discharge-control valve disposed in the second pressurized-gas supply line is controlled on the basis of the determination.

In the apparatus for introducing a pressurized gas according to the second aspect of the present invention, there may be employed a constitution in which a pressurized-gas accumulation tank having a volume greater than the total volume of the measuring tanks is disposed in the first pressurized-gas supply-line between the pressurized-gas supply valve and the pressurized-gas supply-source, whereby the supply of the pressurized gas to the measuring tanks can be more stabilized.

In the apparatus for introducing a pressurized gas according to the second aspect of the present invention including the above embodiment, there can be employed a constitution in which a pressure-regulating valve is disposed somewhere in the second pressurized-gas supply-line, and further, for each measuring tank, whereby the pressure of the pressurized gas to be introduced into the molten resin in the cavity can be optimized, and the pressurized gas can be efficiently used. That is, for example, there can be employed a constitution in which a high-pressure pressurized gas is introduced with certain measuring tank(s) in the initial stage of introducing the pressurized gas into the molten resin in the cavity, and after the initial stage, a relatively low-pressure pressurized gas is introduced with other measuring tank(s). Otherwise, there can be employed a constitution in which a flow-regulating valve is disposed somewhere in the second pressurized-gas supply-line, and further, for each measuring tank, whereby the introduction rate of the pressurized gas to be introduced into the molten resin in the cavity can be optimized. That is, for example, there can be employed a constitution in which the pressurized gas is introduced at a low speed with certain measuring tank(s) in the initial stage of introducing the pressurized gas into the molten resin in the cavity, and after the initial stage, the pressurized gas is introduced at a relatively high speed with other measuring tank(s).

In the apparatus for introducing a pressurized gas according to the second aspect of the present invention including the above embodiments, it is desirable to employ a constitution in which, when the pressurized-gas supply valve is brought into an open state, the pressurized-gas discharge valve is in a close state, whereby the pressurized gas having a predetermined pressure can be reliably supplied to the measuring tanks.

In the apparatus for introducing a pressurized gas according to the second aspect of the present invention including the above various embodiments, the pressurized-gas supply/discharge-control valves may simultaneously come to be in an open state, or the pressurized-gas supply/discharge-control valves may not simultaneously come to be in an open state (that is, the pressurized-gas supply/discharge-control valves are consecutively brought into an open state). In essence, it is sufficient to decide what constitution should be employed, on the basis of the volumes of the measuring tanks, the pressures of the pressurized gases in the measuring tanks, the volume of a hollow portion to be formed, and the like.

The injection molding method for producing a molded article having a hollow portion according to a first aspect of the present invention for achieving the above object is an injection molding method for producing a molded article having a hollow portion by injecting a molten resin into a cavity provided in a mold and introducing a pressurized gas into the molten resin in the cavity, said method comprising;

providing an apparatus for introducing a pressurized gas, which comprises;

(A) a pressurized-gas supply-source, (B) a plurality of measuring tanks, (C) a first pressurized-gas supply-line for supplying the pressurized gas to each measuring tank from the pressurized-gas supply-source, (D) a pressurized-gas supply valve disposed somewhere in the first pressurized-gas supply-line, (E) a second pressurized-gas supply-line for introducing the pressurized gas into the molten resin in the cavity from the measuring tank, and (F) a pressurized-gas discharge-control valve disposed somewhere in the second pressurized-gas supply-line, determining a combination of the measuring tanks in advance on the basis of the amount of the pressurized gas to be required for forming the hollow portion in the molded article, bringing the pressurized-gas discharge-control valve into a close state and bringing the pressurized-gas supply valve into an open state to supply the pressurized gas to the measuring tanks combined, and then, bringing the pressurized-gas supply valve into a close state, injecting the molten resin into the cavity provided in the mold, and bringing the pressurized-gas discharge-control valve disposed in the second pressurized-gas supply-line into an open state on the basis of said determination, to introduce the pressurized gas into the molten resin in the cavity for forming the hollow portion.

In the injection molding method for producing a molded article having a hollow portion according to the first aspect of the present invention (to be referred to as "injection molding method according to the first aspect of the present invention" hereinafter), the pressurized-gas discharge-control valves may be simultaneously brought into an open state, or the pressurized-gas discharge-control valves may not simultaneously be brought into an open state (that is, the pressurized-gas discharge-control valves are consecutively brought into an open state). In essence, it is sufficient to decide what constitution should be employed, on the basis of the volumes of the measuring tanks, the pressures of the pressurized gases in the measuring tanks, the volume of a hollow portion to be formed, and the like.

In the injection molding method according to the first aspect of the present invention including the above various embodiments, there can be used an apparatus for introducing a pressurized gas, in which a pressure-regulating valve is disposed somewhere in the first pressurized-gas supply-line, and further, for each measuring tank.

Alternatively, there can be used an apparatus for introducing a pressurized gas, in which a pressurized-gas accumulation tank having a volume greater than the total volume of the measuring tanks is disposed in the first pressurized-gas supply-line between the pressurized-gas supply valve and the pressurized-gas supply-source. In this case, there can be used an apparatus for introducing a pressurized gas, in which a pressure-regulating valve is disposed somewhere in the first pressurized-gas supply-line between the pressurized-gas accumulation tank and the measuring tank, and further, for each measuring tank.

Further, there can be used an apparatus for introducing a pressurized gas, in which a flow-regulating valve is disposed somewhere in the second pressurized-gas supply-line, and further, for each measuring tank.

The injection molding method for producing a molded article having a hollow portion according to a second aspect of the present invention for achieving the above object is an injection molding method for producing a molded article having a hollow portion by injecting a molten resin into a cavity provided in a mold and introducing a pressurized gas into the molten resin in the cavity, said method comprising;

providing an apparatus for introducing a pressurized gas, which comprises;

(A) a pressurized-gas supply-source, (B) a plurality of measuring tanks, (C) a first pressurized-gas supply-line connected to the pressurized-gas supply-source, (D) a second pressurized-gas supply-line that is connected to a terminal of the first pressurized-gas supply-line and that is for supplying the pressurized gas to each measuring tank from the pressurized-gas supply-source, (E) a third pressurized-gas supply-line that is connected to the terminal of the first pressurized-gas supply-line and communicates with the second pressurized-gas supply-line and that is for introducing the pressurized gas into the molten resin in the cavity from the measuring tank, (F) a pressurized-gas supply valve disposed somewhere in the first pressurized-gas supply-line, (G) a pressurized-gas supply/discharge-control valve disposed somewhere in the second pressurized-gas supply-line, and (H) a pressurized-gas discharge valve disposed somewhere in the third pressurized-gas supply-line, determining a combination of the measuring tanks in advance on the basis of the amount of the pressurized gas required for forming the hollow portion in the molded article, bringing the pressurized-gas discharge valve into a close state and bring the pressurized-gas supply/discharge-control valve and the pressurized-gas supply valve into an open state to supply the pressurized gas to the measuring tanks combined, and then, bringing the pressurized-gas supply/discharge-control valves and the pressurized-gas supply valve into a close state, injecting the molten resin into the cavity provided in the mold, and bringing the pressurized-gas supply/discharge-control valve disposed in the second pressurized-gas supply-line into an open state on the basis of said determination and bring the pressurized-gas discharge valve into an open state, to introduce the pressurized gas into the molten resin in the cavity for forming the hollow portion.

In the injection molding method for producing a molded article having a hollow portion according to the second aspect of the present invention (to be referred to as "injection molding method according to the second aspect of the present invention" hereinafter), the pressurized-gas supply/discharge-control valves may be simultaneously brought into an open state, or the pressurized-gas supply/discharge-control valves may not simultaneously be brought into an open state (that is, the pressurized-gas supply/discharge-control valves are consecutively brought into an open state). In essence, it is sufficient to decide what constitution should be employed, on the basis of the volumes of the measuring tanks, the pressures of the pressurized gases in the measuring tanks, the volume of a hollow portion to be formed, and the like.

In the injection molding method according to the second aspect of the present invention including the above various embodiments, there can be used an apparatus for introducing a pressurized gas, in which a pressurized-gas accumulation tank having a volume greater than the total volume of the measuring tanks is disposed in the first pressurized-gas supply-line between the pressurized-gas supply valve and the pressurized-gas supply-source. In this case, there can be used an apparatus for introducing a pressurized gas, in which a pressure-regulating valve is disposed somewhere in the second pressurized-gas supply-line, and further, for each measuring tank. Further, there can be employed an apparatus for introducing a pressurized gas, in which a flow-regulating valve is disposed somewhere in the second pressurized-gas supply-line, and further, for each measuring tank.

In the apparatus for introducing a pressurized gas according to the first or second aspect of the present invention or the injection molding method according to the first or second aspect of the present invention, the pressurized gas can be selected from substances that are in the form of a gas at an ordinary temperature, and it can be also selected from gases that are liquefied under high pressure. Specifically, examples thereof include pressurized nitrogen gas, pressurized carbon dioxide gas, pressurized air and pressurized helium gas.

In the apparatus for introducing a pressurized gas according to the first aspect of the present invention or the injection molding method according to the first aspect of the present invention, when the number of the measuring tanks is N (N≧2), the number of the first pressurized-gas supply-line(s) for connecting the pressurized-gas supply-source (or the pressurized-gas accumulation tank) to the measuring tanks may be N. Alternatively, one first pressurized-gas supply-line may be extended from the pressurized-gas supply-source (or the pressurized-gas accumulation tank) and may be branched into the first pressurized-gas supply-lines in the number of N at the end of the extending line. In the former case, the pressurized-gas supply valves and the pressure-regulating valves can be disposed in the first pressurized-gas supply-lines in the number of N, and in the latter case, they can be disposed in the branched first pressurized-gas supply-lines in the number of N. In the latter case, alternatively, the pressurized-gas supply valve may be disposed in the one first pressurized-gas supply-line before it is branched. The second pressurized-gas supply-lines in the number of N are extended from the measuring tanks in the number of N and are combined into one second pressurized-gas supply-line, and the one second pressurized-gas supply-line is connected to the pressurized-gas introduction nozzle. The pressurized-gas introduction nozzle is disposed in the mold. The pressurized-gas introduction nozzle may be opened to the cavity, may be opened to a gate portion, may be opened to a resin flow passageway connecting an injection cylinder provided in an injection molding machine and the cavity, or may be opened to the forward end portion of the injection cylinder. The pressurized-gas discharge-control valves may be disposed in the second pressurized-gas supply-lines in the number of N extending from the measuring tanks in the number of N. Otherwise, one pressurized-gas discharge-control valve may be disposed in one second pressurized-gas supply-line into which the second pressurized-gas supply-lines are combined.

In the apparatus for introducing a pressurized gas according to the second aspect of the present invention or the injection molding method according to the second aspect of the present invention, the number of the second pressurized-gas supply-lines connected to the terminal of the first pressurized-gas supply-line may be N. Or, the number of the second pressurized-gas supply-line connected to the terminal of the first pressurized-gas supply-line may be one, and the one second pressurized-gas supply-line may be branched to the second pressurized-gas supply-lines in the number of N on the end of the one second pressurized-gas supply-line. In the former case, the pressurized-gas supply/discharge-control valves, the pressure-regulating valves and the flow-regulating valves may be disposed in the second pressurized-gas supply-lines in the number of N. In the later case, they may be disposed in the branched second pressurized-gas supply-lines in the number of N. The number of the third pressurized-gas supply-line connected to the terminal of the first pressurized-gas supply-line is preferably one from the viewpoint of simplification of the constitution. The third pressurized-gas supply-line is connected to the pressurized-gas introduction nozzle. The pressurized-gas introduction nozzle is disposed in the mold. The pressurized-gas introduction nozzle may be opened to the cavity, may be opened to a gate portion, may be opened to a resin flow passageway connecting an injection cylinder provided in an injection molding machine and the cavity, or may be opened to the forward end portion of the injection cylinder.

The volumes and number (N) of the measuring tanks can be determined as required depending upon the volume of the hollow portion to be formed. The volume of one measuring tank may be the same as, or may be different from, the volume(s) of the other one, the other ones or every other one. In the latter case, when the volume of a measuring tank having the smallest volume is $V_0$, the volume $V_n$ of a measuring tank in the n-th place (n=2, 3 . . . N) preferably satisfies $2^{(n-1)}V_0$ from the viewpoint of simplification of the constitution, while the volumes of the measuring tanks shall be limited thereto.

In the injection molding method according to the first or second aspect of the present invention, the amount of a molten resin to be injected into the cavity provided in the mold may be such an amount that the resin is completely filled in the cavity (employment of a so-called full shot), or may be such an amount that the resin is not completely filled in the cavity (employment of a so-called short shot). The introduction of the pressurized gas into the molten resin in the cavity may be started during the injection of the molten resin into the cavity, upon completion of the injection or a certain period of time after completion of the injection.

The mold, the pressurized-gas supply-source, the pressurized-gas accumulation tank, the measuring tank, the first pressurized-gas supply-line, the second pressurized-gas supply-line, the third pressurized-gas supply-line, the pressurized-gas supply valve, the pressurized-gas discharge-control valve, the pressurized-gas supply/discharge-control valve, the pressurized-gas discharge valve, the pressure-regulating valve and the flow-regulating valve can have well-known constitutions and structures. The pressurized-gas supply valve, the pressurized-gas discharge-control valve, the pressurized-gas supply/discharge-control valve, the pressurized-gas discharge valve, the pressure-regulating valve and the flow-regulating valve can be controlled with known control devices.

The resin suitable for use in the injection molding method according to the first or second aspect of the present invention includes crystalline thermoplastic resins and amorphous thermoplastic resins. Specific examples thereof include polyolefin resins such as a polyethylene resin and a polypropylene resin; polyamide resins such as polyamide 6, polyamide 66 and polyamide MXD6; a polyoxymethylene resin (polyacetal, POM) resin; polyester resins such as a polyethylene terephthalate (PET) resin and polybutylene terephthalate (PBT) resin; a polyphenylene sulfide resin: styrene resins such as a polystyrene resin, an ABS resin, an AES resin and an AS resin; a methacrylate resin: a polycarbonate resin; a modified polyphenylene ether (PPE) resin; a polysulfone resin; a polyether sulfone resin; a polyallylate resin; a polyetherimide resin; a polyamideimide resin; a polyimide resin; a polyether ketone resin; a polyether ether ketone resin; a polyester carbonate resin; and a liquid crystal polymer.

Further, a thermoplastic resin of a polymer alloy material can be used. The above polymer alloy material includes a blend of at least two thermoplastic resins and a block or graft copolymer obtained by chemically bonding at least two thermoplastic resins. Polymer alloy materials are widely used as high-functional materials that can have performances inherent to individual thermoplastic resins. The thermoplastic resins constituting the polymer alloy material that is a blend of at least two thermoplastic resins include styrene resins such as a polystyrene resin, an ABS resin, an AES resin and an AS resin; polyolefin resins such as a polyethylene resin and polypropylene resin; a methacrylate resin; a polycarbonate resin; polyamide resins such as polyamide 6, polyamide 66 and polyamide MXD 6; a modified PPE resin; polyester resins such as a polybutylene terephthalate resin and a polyethylene terephthalate resin; a polyoxymethylene resin; a polysulfone resin; a polyimide resin; a polyphenylene sulfide resin; a polyallylate resin; a polyether sulfone resin; a polyether ketone resin; a polyether ether ketone resin; and a polyester carbonate resin. As a polymer alloy material that is a blend of two thermoplastic resins, for example, there is a polymer alloy material from a polycarbonate resin and an ABS resin. This combination of the resins will be described as "polycarbonate resin/ABS resin", and such a combination of resins will be described in the same manner. Further, examples of the polymer alloy material that is a blend of at least two thermoplastic resins include polycarbonate resin/PET resin, polycarbonate resin/PBT resin, polycarbonate resin/polyamide resin, polycarbonate resin/PBT resin/PET resin, modified PPE resin/HIPS resin, modified PPE resin/polyamide resin, modified PPE resin/PBT resin/PET resin, modified PPE resin/polyamide MXD6 resin, polyoxymethylene resin/polyurethane resin and PBT resin/PET resin.

In addition, an additive, a filler and a reinforcing agent can be also added to the above various thermoplastic resins.

Examples of the additives include a plasticizer; a stabilizer; an antioxidant; an ultraviolet absorbent; ultraviolet stabilizers such as organic nickel compounds including nickel bis(octylphenyl) sulfide and a hindered amine compound; an antistatic agent; a flame retardant; fungicides such as Vinyzene, Preventol and Thiabendazole; lubricants such as liquid paraffin, polyethylene wax and fatty acid amide; organic expanding agents such as ADCA; a transparent nucleating agent; various colorants such as organic pigments and inorganic pigments; a crosslinking agent; and high-impact strength modifiers such as an acryl graft polymer and MBS.

The plasticizer includes phthalic acids such as diethyl phthalate, di-n-butyl phthalate, 2-ethylhexyl phthalate, diisononyl phthalate, butylbenzyl phthalate and dicyclohexyl phthalate; phosphoric esters such as triethyl phosphate, tributyl phosphate, tricresyl phosphate and triphenyl phosphate; fatty acid basic esters such as butyl oleate, dibutyl adipate, n-hexyl adipate and di-2-ethylhexyl adipate; alcohol esters such as diethylene glycol dibenzoate; oxy acid esters such as acetyltriethyl citrate and dibutyl maleate; a trimellitate plasticizer; a polyester plasticizer; an epoxy plasticizer; and a chloroparaffin plasticizer.

The stabilizer includes organotin stabilizers such as a di-n-octyltin compound, a di-n-butyltin compound and a dimethyltin compound; lead compound stabilizers such as tribasic lead sulfate, dibasic lead phosphite and lead silicate; metal soap stabilizers such as cadmium soap, lead soap and zinc soap; trisnonyl phosphate; and trisnonylphenyl phosphate.

The antioxidant includes phenol-containing antioxidants such as dibutyl cresol and butyl hydroxyanisol; bisphenol-containing antioxidants such as methylene bis(methylbutylphenol) and thiobis(methylbutylphenol); polyphenol-containing antioxidants such as tris(methylhydroxybutylphenyl) butane and tocophenol; organic sulfur compounds such as dimyristoyl thiodipropionate; and organic phosphorus compounds such as tris(mono/dinonylphenyl) phosphite.

The ultraviolet absorbent includes salicylic acid ultraviolet absorbents such as phenyl salicylate and butylphenyl salicylate; benzophenone ultraviolet absorbents such as dihydroxybenzophenone; benzotriazole ultraviolet absorbents such as (hydroxymethylphenyl)benzotriazole; and cyanoacrylate ultraviolet absorbents such as ethylhexyl cyanodiphenyl acrylate.

The antistatic agent include nonionic surfactant antistatic agents such as poly(oxymethylene)alkylamine and poly(oxymethylene)alkylphenyl ether; anionic surfactant antistatic agents such as alkylsulfonate, alkylbenzenesulfonate and alkylphosphate; cationic surfactant antistatic agents such as quaternary ammonium chloride; an amphoteric surfactant; and an electrically conductive resin.

The flame retardant includes halogen-containing flame retardants such as tetrabromobisphenol A, polybromobiphenol, bis(hydroxydibromophenyl)propane and chloroparafin; phosphorus-containing flame retardants such as ammonium phosphate and tricresyl phosphate; antimony trioxide; red phosphorus; and tin oxide.

Further, the filler and the reinforcing agent include an inorganic material; metal materials such as a stainless steel fiber, a high-strength amorphous metal fiber, a stainless steel foil, a steel foil and a copper foil; organic materials such as a high-molecular-weight polyethylene fiber, a high-tenacity polyallylate fiber, a para-wholly aromatic polyamide fiber, an aramid fiber, a PEEK fiber, a PEI fiber, a PPS fiber, a fluorine resin fiber, a phenolic resin fiber, a vinylon fiber and a polyacetal fiber; and a powder.

The inorganic filler and reinforcing agent include glass materials such as a glass fiber, a glass filament fiber and a quartz glass fiber; carbon fibers such as a PAN carbon fiber, a pitch carbon fiber and a graphite whisker; silicon carbide materials such as a silicon carbide fiber, a silicon carbide continuous fiber, a silicon carbide whisker and a silicon carbide whisker sheet; boron materials such as a boron fiber; Si—Ti—C—O materials such as an Si—Ti—C—O fiber; potassium titanate materials such as a potassium titanate fiber, a potassium titanate whisker and a potassium-titanatecontaining electrically conductive whisker; silicon nitride materials such as a silicon nitride whisker and a silicon nitride whisker sheet; and calcium sulfate materials such as a calcium sulfate whisker.

The powder filler and reinforcing agent include mica flakes, a mica powder, sirasu balloons, a silica fine powder, a talc powder, an aluminum hydroxide powder, a magnesium hydroxide powder, a magnesium silicate powder, a calcium sulfate powder, a spherical hollow glass powder, a metal powder, a high-purity synthetic silica fine powder, a tungsten disulfide powder, a tungsten carbide powder, a zirconia fine powder, a zirconia-containing fine powder, a partially stabilized zirconia powder, an alumina-zirconia composite powder, a composite metal powder, an iron powder, an aluminum powder, a molybdenum metal powder, a tungsten powder, an aluminum nitride powder, a nylon fine powder, a silicone resin fine powder, a spinel powder, an amorphous alloy powder, aluminum flakes and glass flakes.

In the present invention, the measuring tanks in the number of N are used, a combination of the measuring tanks is determined on the basis of the amount of the pressurized gas to be required for forming the hollow portion in the molded article, and the introduction of the pressurized gas into the molten resin is controlled on the basis of the above determination, so that the pressurized gas having a predetermined volume required for forming the hollow portion can be reliably introduced, although the apparatus for introducing a pressurized gas is simply constituted and structured.

BRIEF DESCRIPTION OF THE DRAWINGS

FIG. 2B, are conceptual views of the apparatus for introducing a pressurized gas, which are for explaining the injection molding method in Example 1.

FIG. 5B, is a conceptual view of the apparatus for introducing a pressurized gas, which is for explaining the injection molding method in Example 3.

FIG. 8B, are conceptual views of the apparatus for introducing a pressurized gas, which are for explaining the injection molding method in Example 4.

FIG. 17B, are conceptual views of the apparatus for introducing a pressurized gas, which are for explaining the injection molding method in Example 8.

FIG. 20B, is a conceptual view of the apparatus for introducing a pressurized gas, which is for explaining the injection molding method in Example 10.

DETAILED DESCRIPTION OF THE INVENTION

The present invention will be explained on the basis of Examples with reference to drawings.

Example 1

Figure 1:
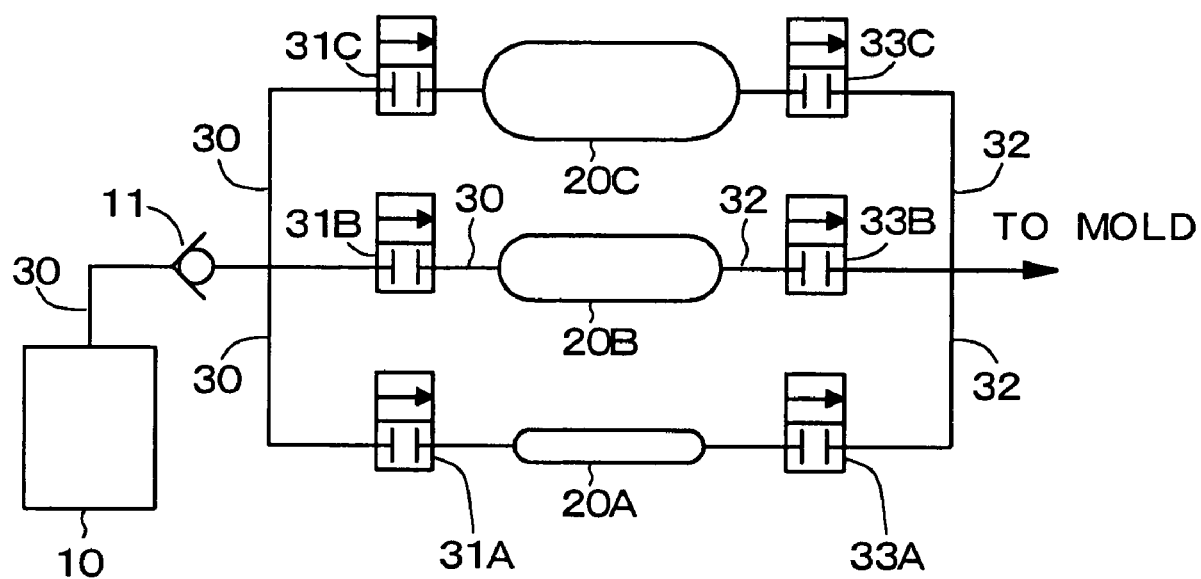
FIG. 1 is a conceptual view of an apparatus for introducing a pressurized gas in an Example 1.

Example 1 is concerned with the apparatus for introducing a pressurized gas and the injection molding method according to a first aspect of the present invention. FIG. 1 shows a conceptual view of an apparatus for introducing a pressurized gas in Example 1.

This apparatus for introducing a pressurized gas is an apparatus for introducing a pressurized gas for use in the injection molding method in which a molten resin is injected into a cavity provided in a mold that is not shown and a pressurized gas is introduced into the molten resin in the cavity to produce a molded article having a hollow portion.

And, the apparatus for introducing a pressurized gas comprises;

(A) a pressurized-gas supply-source 10, (B) a plurality of measuring tanks 20A, 20B and 20C, (C) a first pressurized-gas supply-line 30 for supplying the pressurized gas (specifically, pressurized nitrogen gas) from the pressurized-gas supply-source 10 to each measuring tank 20A, 20B and 20C, (D) pressurized-gas supply valves 31A, 31B and 31C disposed somewhere in the first pressurized-gas supply-line 30, (E) a second pressurized-gas supply-line 32 for introducing the pressurized gas into the molten resin in the cavity from the measuring tank 20A, 20B and 20C, and (F) pressurized-gas discharge-control valves 33A, 33B and 33C disposed somewhere in the second pressurized-gas supply-lines 32.

In Example 1, the number of the measuring tanks is 3, while the number thereof shall not be limited thereto.

In Example 1, one first pressurized-gas supply-line 30 is extended from the pressurized-gas supply-source 10, and it is branched into three first pressurized-gas supply-lines 30 somewhere en route. The pressurized-gas supply valves 31A, 31B and 31C are disposed in the three branched first pressurized-gas supply-lines 30. A check valve 11 is disposed somewhere in the one first pressurized-gas supply-line 30 extending from the pressurized-gas supply-source 10. Three second pressurized-gas supply-lines 32 are extended from the three measuring tanks 20A, 20B and 20C and combined into one second pressurized-gas supply-line 32, and the one second pressurized-gas supply-line 32 is connected to a pressurized-gas introduction nozzle (not shown). The pressurized-gas introduction nozzle is disposed in the mold and opened to the cavity. The pressurized-gas discharge-control valves 33A, 33B and 33C are disposed in the three second pressurized-gas supply-lines 32 extending from the three measuring tanks 20A, 20B and 20C. It is preferred to dispose a check value (not shown) in each of the second pressurized-gas supply-lines 32 as required, for preventing the counterflow of the pressurized gas into the measuring tanks, which is also applicable to Examples 2 and 4 to 7 to be described later.

When the measuring tank 20A having the smallest volume has a volume $V_0$ (=50 cm$^3$), the measuring tank in an n-th place (n=2, 3) has a volume $V_n$ of $2^{(n-1)}V_0$.

In the apparatus for introducing a pressurized gas in Example 1, a combination of the measuring tanks 20A, 20B and 20C is determined on the basis of the amount of the pressurized gas to be required for forming the hollow portion in the molded article, and the open/close of the pressurized-gas discharge-control valves 33A, 33B and 33C disposed in the second pressurized-gas supply-lines 32 is controlled on the basis of the above determination.

The injection molding method in Example 1 will be explained below with reference to FIGS. 2A and 2B and FIGS. 3A and 3B. A measuring tank with a high-pressure pressurized gas accumulated therein is indicated by a cross hatching, a measuring tank with a low-pressure pressurized gas accumulated therein is indicated by a hatching, and a measuring tank that is not in use has no hatching, which will be applicable to other drawings explaining injection molding methods.

In Example 1, a combination of the measuring tanks is determined in advance on the basis of the amount of the pressurized gas required for forming the hollow portion (volume 40 cm$^3$) in the molded article (volume 150 cm$^3$) and producing a sink-mark-free molded article having an excellent appearance. Specifically, the measuring tanks 20A and 20B are used.

[Step-100]

Figure 2A:
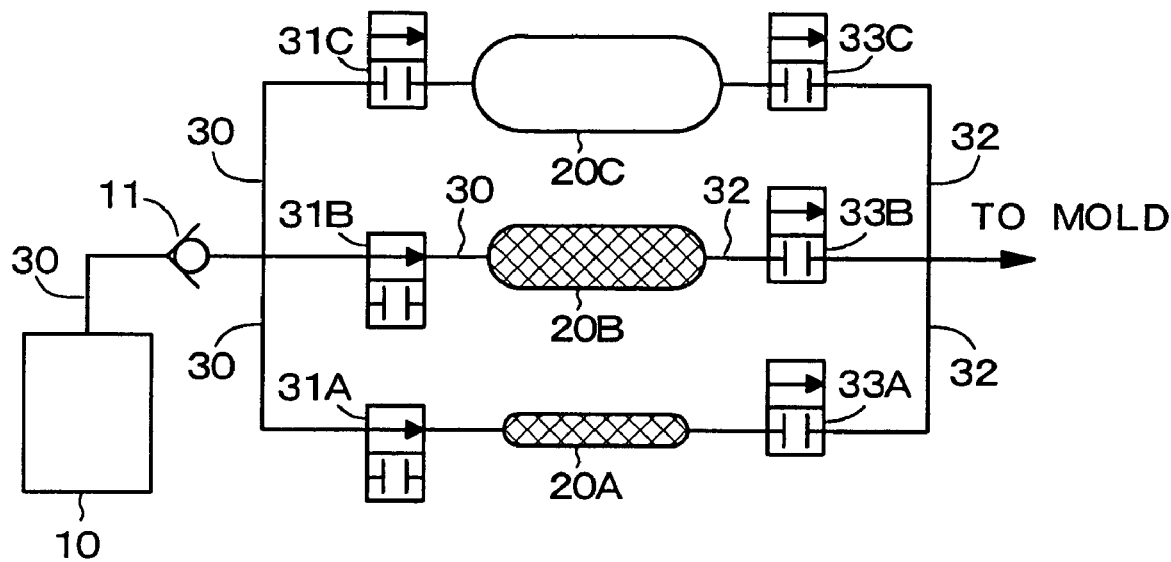
FIGS. 2A and 2B are conceptual views of an apparatus for introducing a pressurized gas, which are for explaining an injection molding method in Example 1.
Figure 2B:
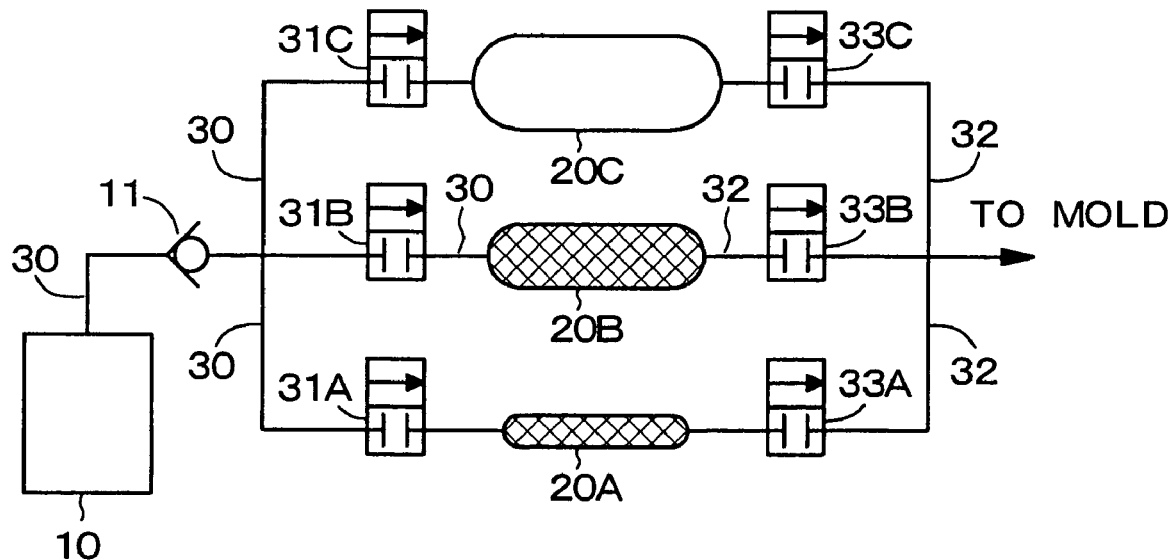

And, as shown in FIG. 2A, the pressurized-gas discharge-control valves 33A, 33B and 33C are brought into a close state, the pressurized-gas supply valves 31A and 31B are brought into an open state (the pressurized-gas supply valve 31C is in a close state since the measuring tank 20C is not used), and the pressurized gas is supplied to the measuring tanks 20A and 20B combined. After completion of the supply, the pressurized-gas supply valves 31A and 31B are brought into a close state (see FIG. 2B). The pressurized gas (pressurized nitrogen gas) in the measuring tanks 20A and 20B had a pressure of $1 \times 10^7$ Pa (100 kgf/cm$^2$).

[Step-110]

In this state, the molten resin is injected into the cavity provided in the mold. The following Table 1 shows an injection condition. As a resin, there was used a modified polyphenylene ether resin (trade name: Iupiace AH40) manufactured by Mitsubishi Engineering-Plastics Corporation.

TABLE 1

| Resin temperature: | 270° C. |
|---|---|
| Mold temperature: | 80° C. |
| Injection time period: | 6.0 seconds |
| Injection amount: | about 110 cm$^3$ |

[Step-120]

Figure 3A:
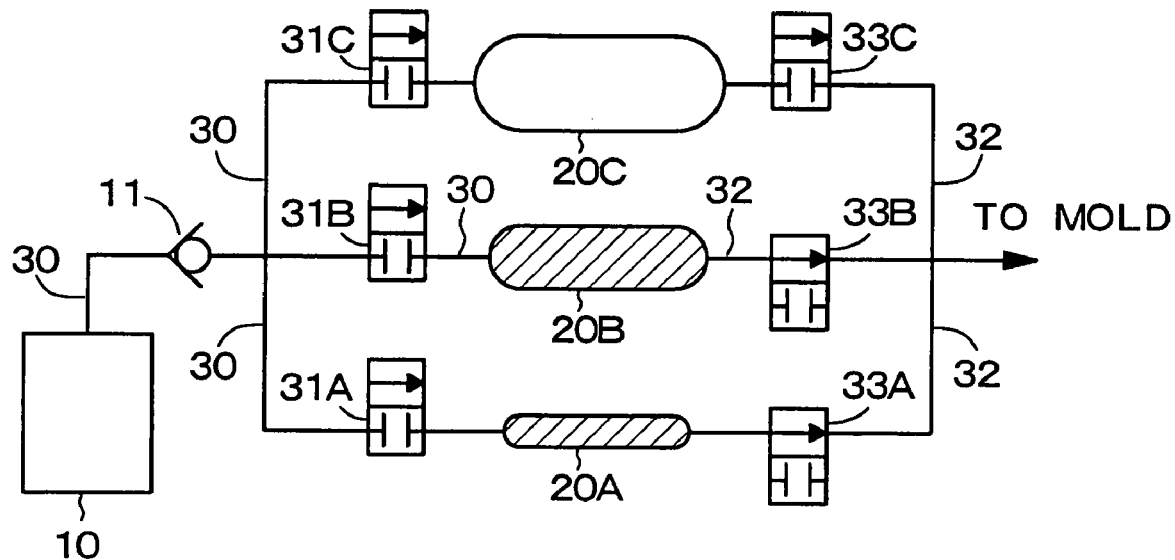
FIGS. 3A and 3B, following
Figure 3B:
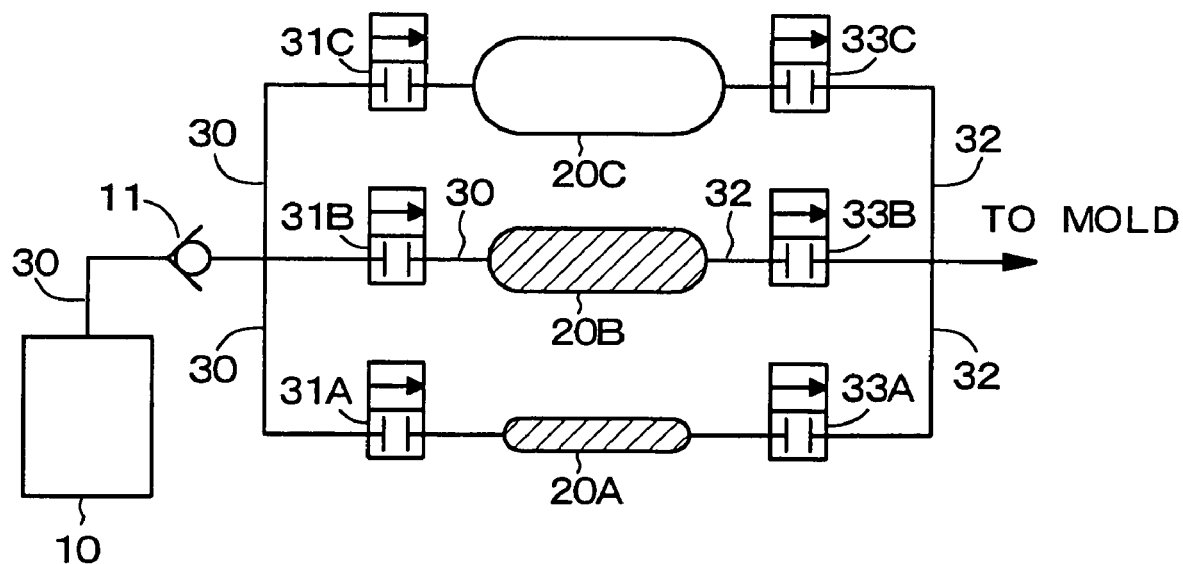

Upon completion of injection of the molten resin, the pressurized-gas discharge-control valves 33A and 33B disposed in the second pressurized-gas supply-lines 32 are brought into an open state on the basis of the previous determination. The pressurized-gas discharge-control valves 33A and 33B are simultaneously brought into an open state. This state is shown in FIG. 3A. The pressurized gas accumulated in the measuring tanks 20A and 20B is thereby introduced into the molten resin in the cavity through the second pressurized-gas supply-lines 32 and the pressurized-gas introduction nozzle, to form the hollow portion.

[Step-130]

In 30 seconds after the initiation of injection of the molten resin, the pressurized-gas discharge-control valves 33A and 33B were brought into a close state (see FIG. 3B), and in 35 seconds after the initiation of injection of the molten resin, the pressurized gas in the hollow portion was released into atmosphere. And, in 60 seconds after the initiation of injection of the molten resin, the mold was opened and the molded article was taken out. The molded article had a desired hollow portion formed. For releasing the pressurized gas in the hollow portion into atmosphere, for example, the pressurized-gas introduction nozzle can be moved backward to form a gap between the resin in the cavity and the pressurized-gas introduction nozzle.

Example 2

Figure 4A:
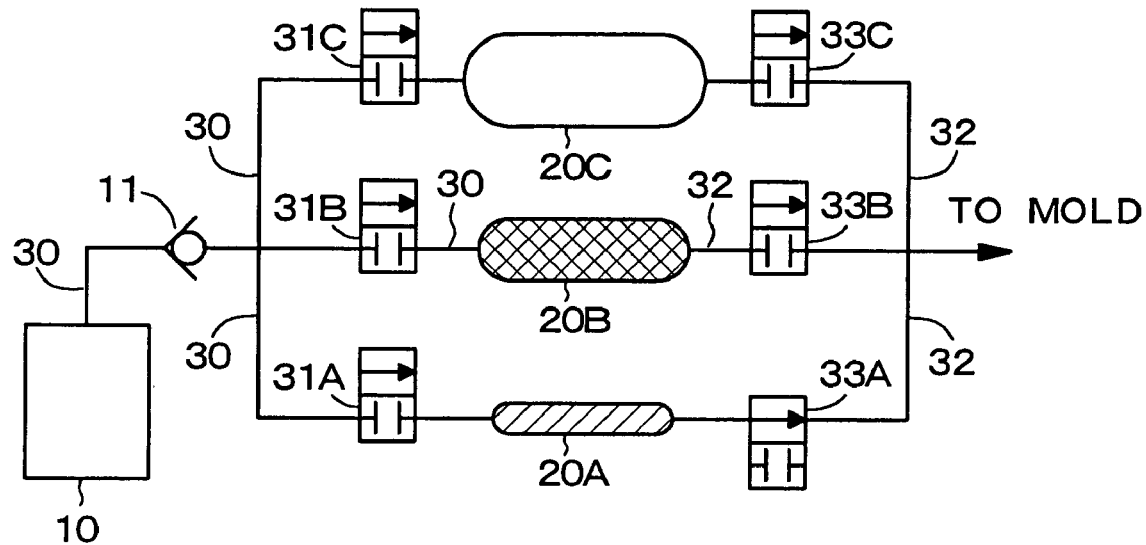
FIGS. 4A and 4B are conceptual views of an apparatus for introducing a pressurized gas, which are for explaining an injection molding method in an Example 2.
Figure 4B:
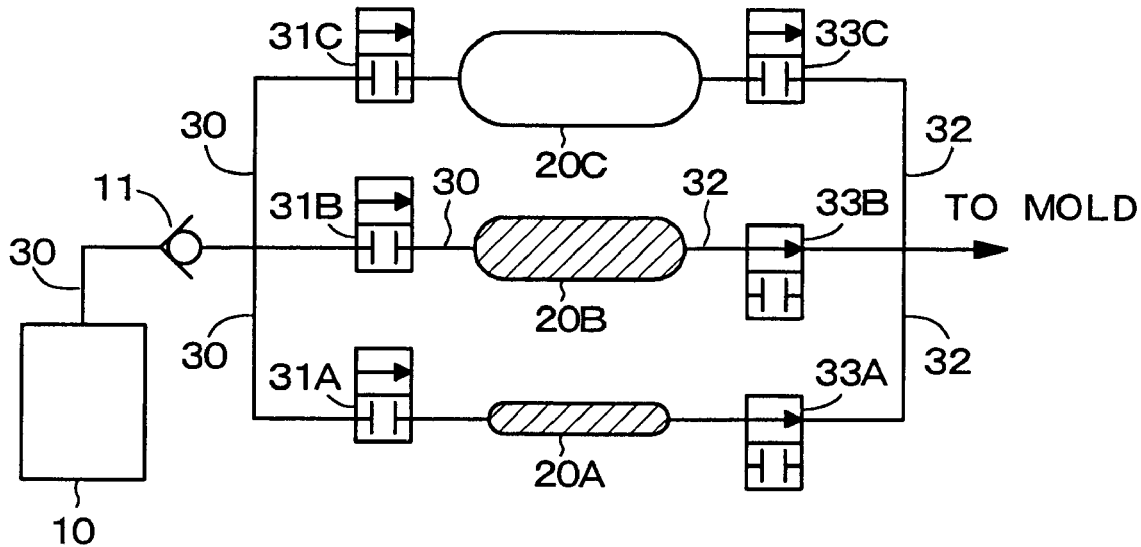

Example 2 is a variant of Example 1. In Example 1, the pressurized-gas discharge-control valves 33A and 33B were simultaneously brought into an open state in [Step-120]. In Example 2, the pressurized-gas discharge-control valves 33A and 33B are not simultaneously brought into an open state. That is, the pressurized-gas discharge-control valves 33A and 33B are consecutively brought into an open state. Specifically, upon completion of injection of the molten resin, first, the pressurized-gas discharge-control valve 32A disposed in the second pressurized-gas supply-line 32 is brought into an open state (see FIG. 4A). In 5 seconds after the pressurized-gas discharge-control valve 33A is brought into an open state, the pressurized-gas discharge-control valve 33B disposed in the second pressurized-gas supply-line 32 is brought into an open state (see FIG. 4B). In this manner, the pressurized gas is consecutively introduced into the molten resin in the cavity, whereby stable introduction of the pressurized gas can be carried out without blowing away the molten resin in the vicinity of the pressurized-gas introduction nozzle as compared with the case of the simultaneous introduction of the pressurized gas in a large amount.

Example 3

Figure 5A:
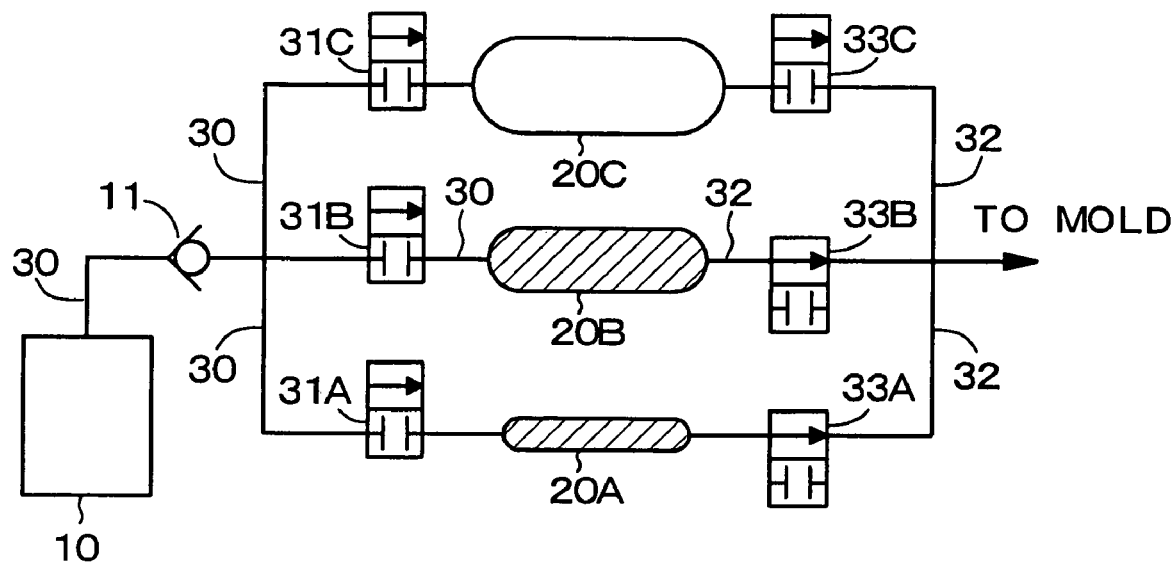
FIGS. 5A and 5B are conceptual views of an apparatus for introducing a pressurized gas, which are for explaining an injection molding method in an Example 3.
Figure 5B:
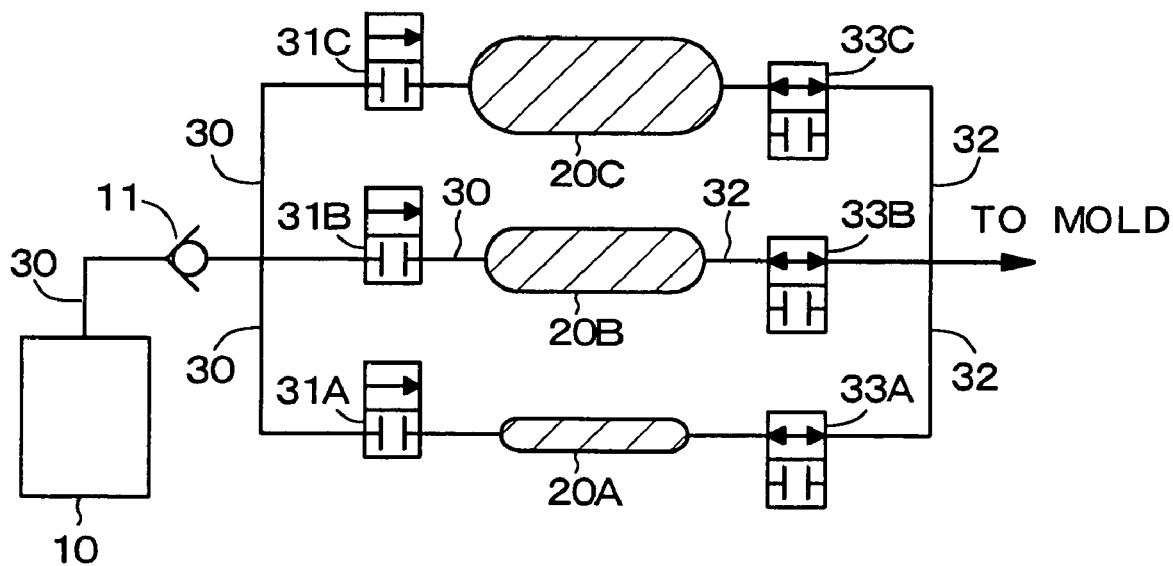
Figure 6:
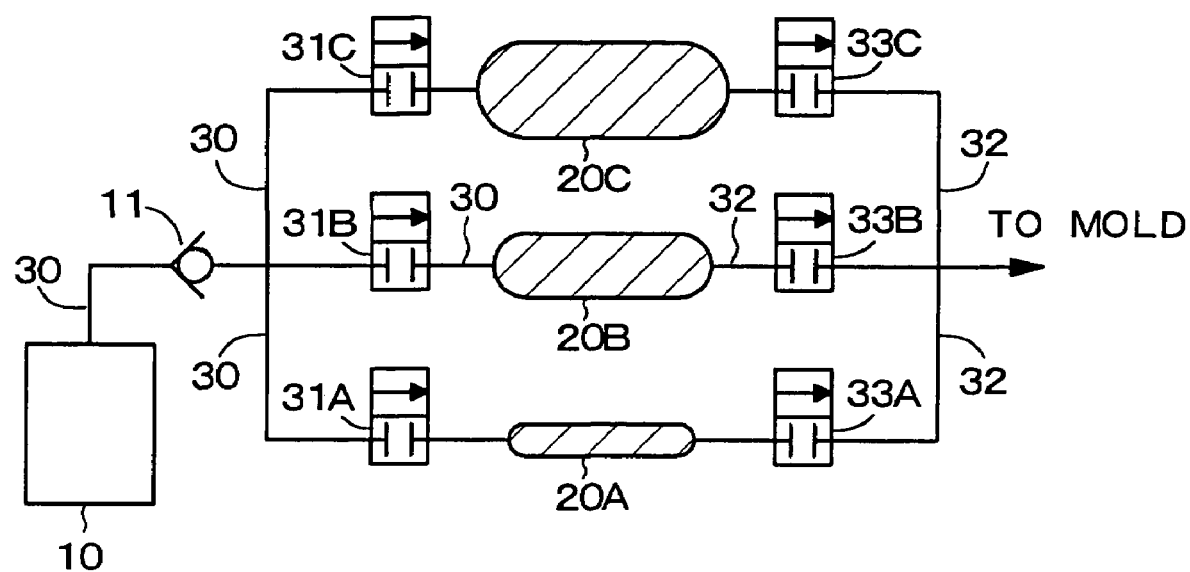
FIG. 6, following

Example 3 is also a variant of Example 1. In Example 1, the pressurized gas in the hollow portion is released into the atmosphere in [Step-130]. In Example 3, the pressurized gas in the hollow portion is recovered into the measuring tank 20C. Specifically, in 25 seconds after the initiation of injection of the molten resin, the pressurized-gas discharge-control valve 33C is brought into an open state, and the pressurized gas in the hollow portion formed inside the resin in the cavity is recovered into the measuring tank 20C. FIGS. 5A and 5B show a state found before the pressurized-gas discharge-control valve 33C is brought into an open state and a state found after it is brought into an open state, respectively. In 30 seconds after the initiation of injection of the molten resin, the pressurized-gas discharge-control valves 33A, 33B and 33C were brought into a close state (see FIG. 6), and in 31 seconds after the initiation of injection of the molten resin, the pressurized gas in the hollow portion was released into the atmosphere. And, in 60 seconds after the initiation of injection of the molten resin, the mold was opened, and the molded article was taken out of the mold. The molded article had a desired hollow portion formed. The pressurized gas in the measuring tank 20C can be fed back to the pressurized-gas supply-source 10 through a recovery line that is not shown.

Example 4

Figure 7:
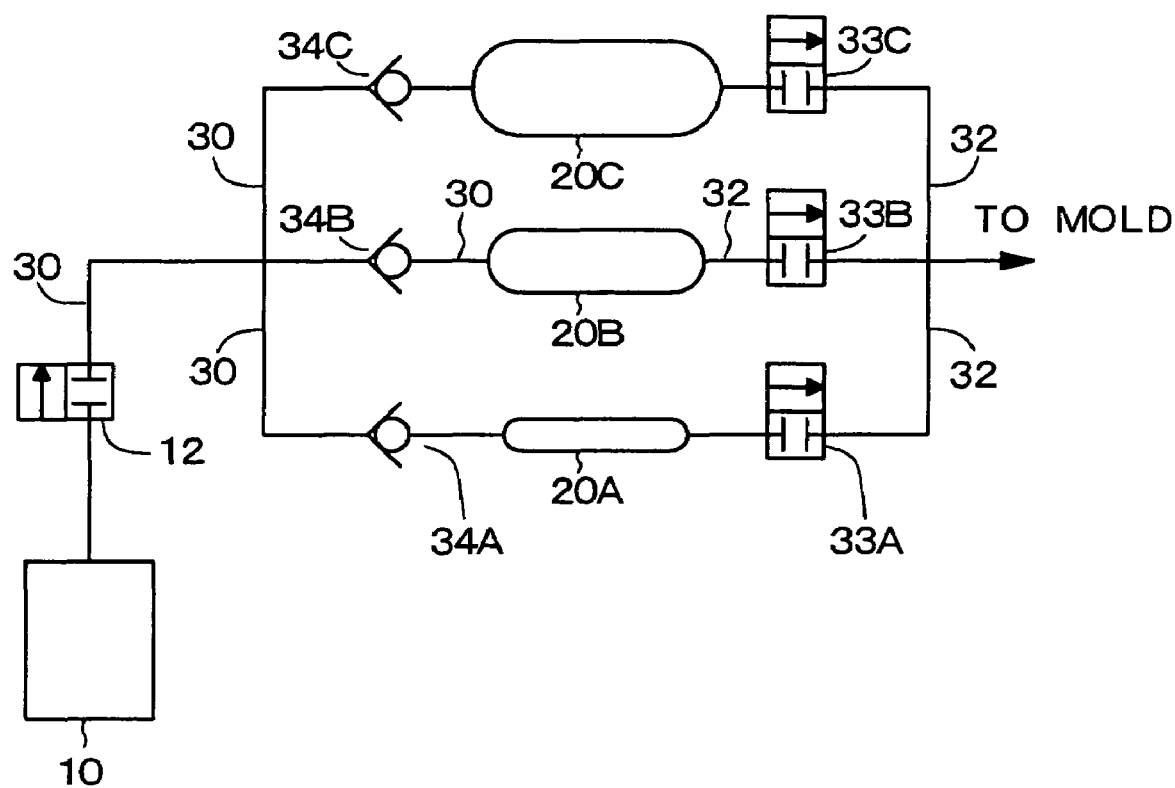
FIG. 7 is a conceptual view of an apparatus for introducing a pressurized gas in an Example 4.

Example 4 is also a variant of Example 1 as well. In Example 4, one first pressurized-gas supply-line 30 is also extended from the pressurized-gas supply-source 10 and is branched into three first pressurized-gas supply-lines 30 at the end thereof as shown in FIG. 7. And, a pressurized-gas supply valve 12 is disposed somewhere in the one first pressurized-gas supply-line 30 before the one first pressurized-gas supply-line 30 is branched. Further, check valves 34A, 34B and 34C are disposed in three branched first pressurized-gas supply-lines 30. The other constitution of the apparatus for introducing a pressurized gas can be made in the same manner as in Example 1, so that the detailed explanation thereof is omitted.

The injection molding method in Example 4 will be explained with reference to FIGS. 8A and 8B and FIGS. 9A and 9B hereinafter.

In Example 4, the same molded article as that in Example 1 is produced, so that the measuring tanks 20A and 20B are used.

[Step-400]

Figure 8A:
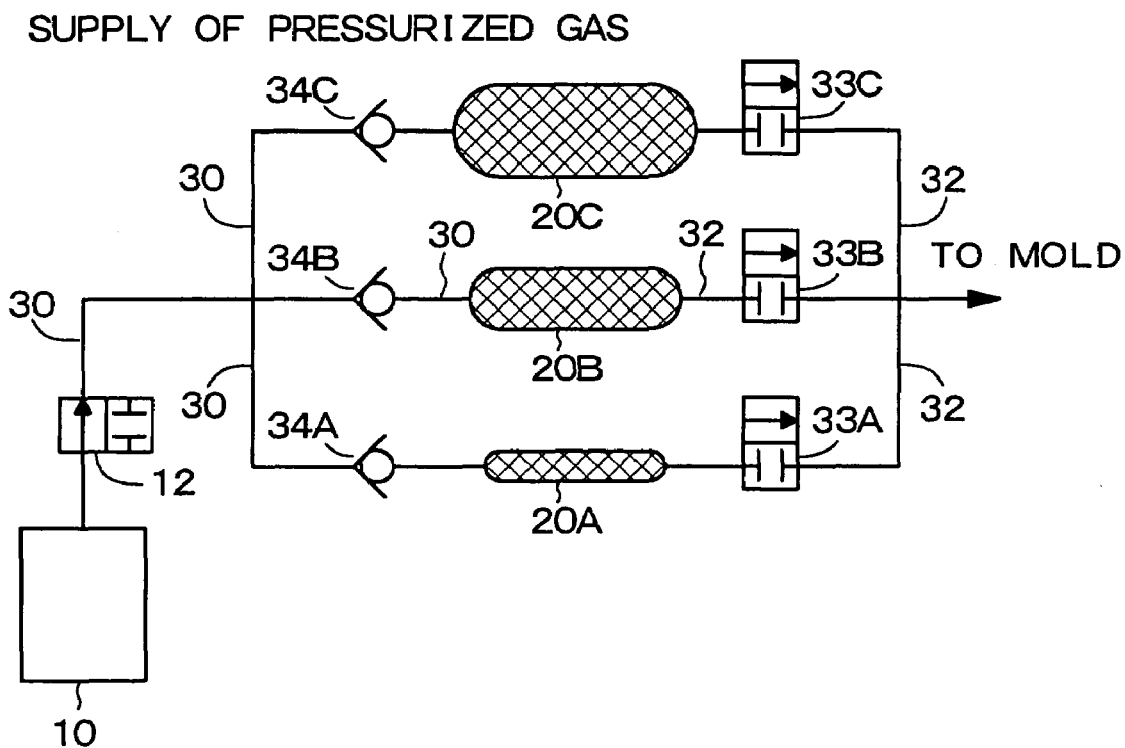
FIGS. 8A and 8B are conceptual views of an apparatus for introducing a pressurized gas, which are for explaining an injection molding method in Example 4.
Figure 8B:
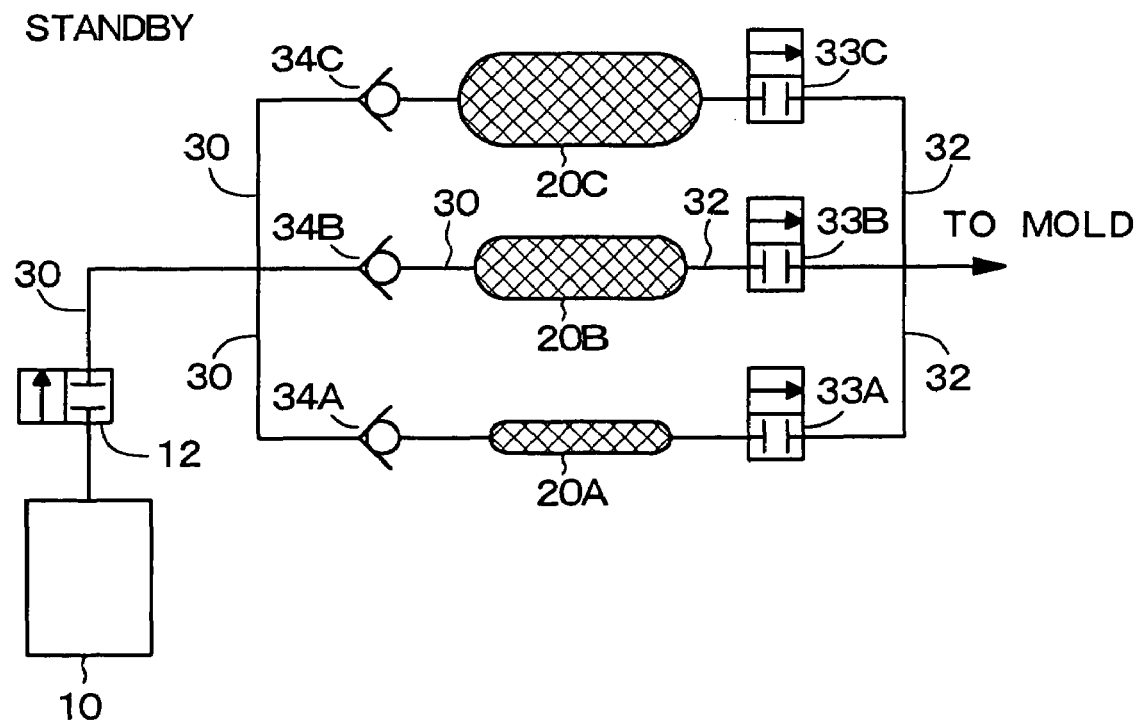

As shown in FIG. 8A, the pressurized-gas discharge-control valves 33A, 33B and 33C are brought into a closed state, and the pressurized-gas supply valve 12 is brought into an open state to supply the pressurized gas to the combined measuring tanks 20A and 20B. The pressurized gas is also supplied to the measuring tank 20C that is not used in this case. After completion of the supply, the pressurized-gas supply valve 12 is brought into a close state (see FIG. 8B). The pressurized gas in each of the measuring tanks 20A and 20B has the same pressure as that in Example 1.

[Step-410]

In this state, the molten resin is injected into the cavity provided in the mold in the same manner as in [Step-110] of Example 1.

[Step-420]

Figure 9A:
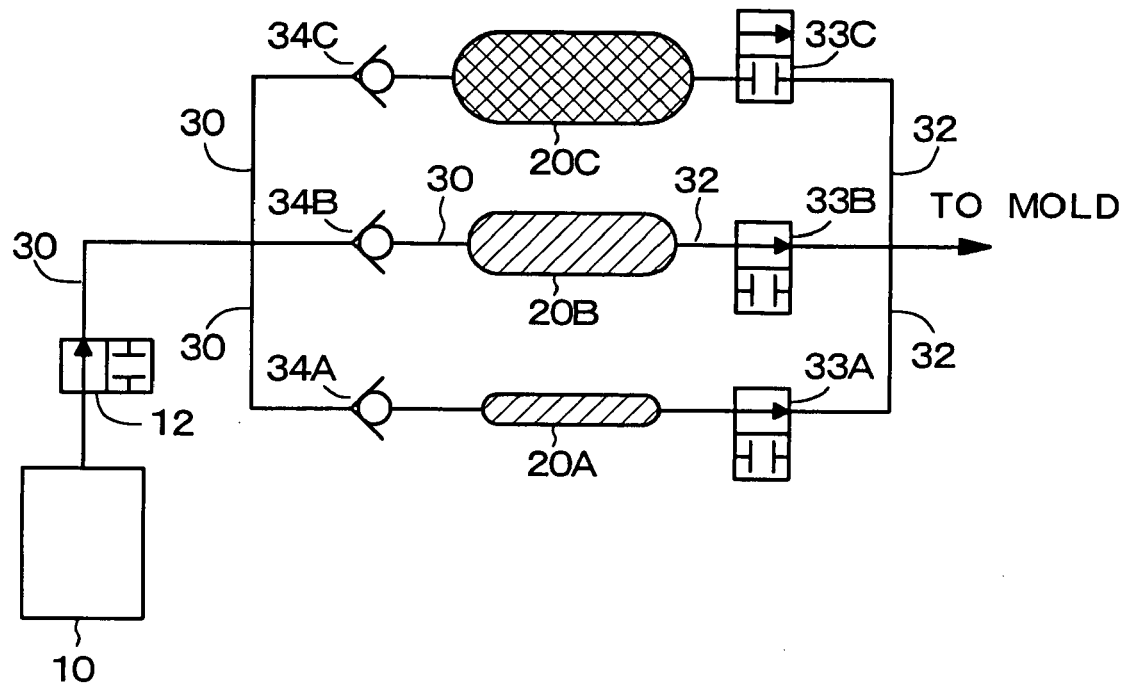
FIGS. 9A and 9B, following
Figure 9B:
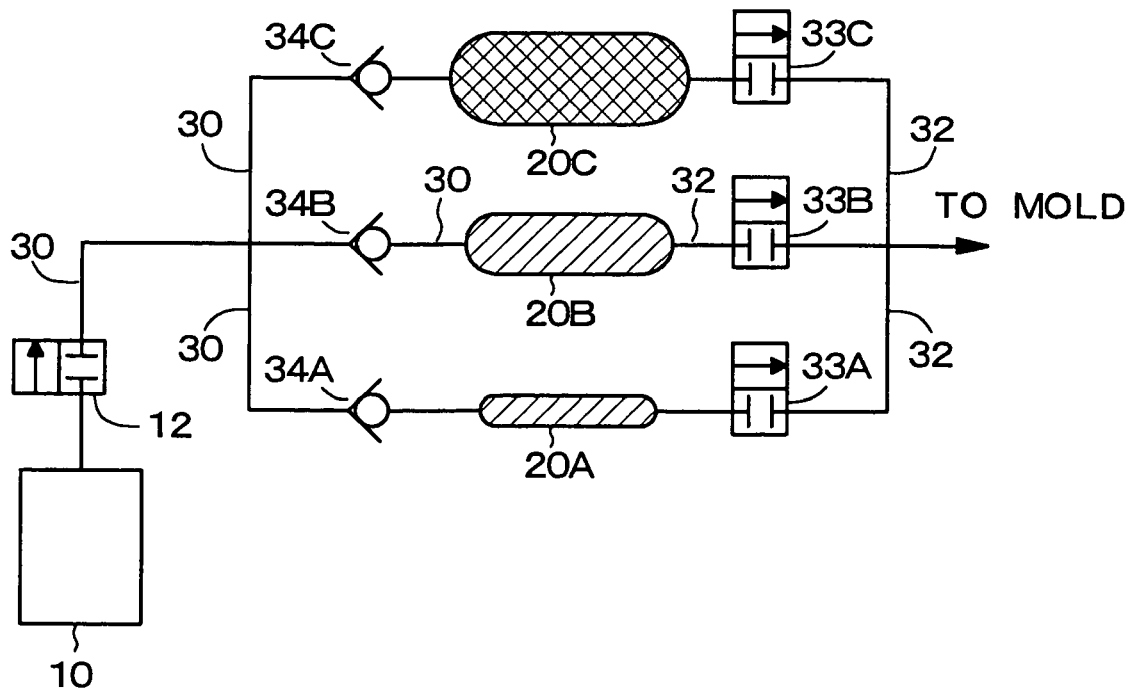

Upon completion of injection of the molten resin, the pressurized-gas discharge-control valves 33A and 33B disposed in the second pressurized-gas supply-lines 32 are brought into an open state on the basis of the previous determination. The pressurized-gas discharge-control valves 33A and 33B are simultaneously brought into an open state. This state is shown in FIG. 9A. The pressurized gas accumulated in the measuring tanks 20A and 20B is thereby introduced into the molten resin in the cavity through the second pressurized-gas supply-lines 32 and a pressurized-gas introduction nozzle, to form the hollow portion. Like Example 2, the pressurized-gas discharge-control valves 33A and 33B may not simultaneously be brought into an open state. That is, the pressurized-gas discharge-control valves 33A and 33B may be consecutively brought into an open state.

[Step-430]

Then, in the same manner as in [Step-130] of Example 1, the pressurized-gas discharge-control valves 33A and 33B were brought into a closed state (see FIG. 9B), the pressurized gas in the hollow portion was released into atmosphere, the mold was opened, and then, the molded article was taken out of the mold. The molded article had a desired hollow portion formed.

Example 5

Figure 10:
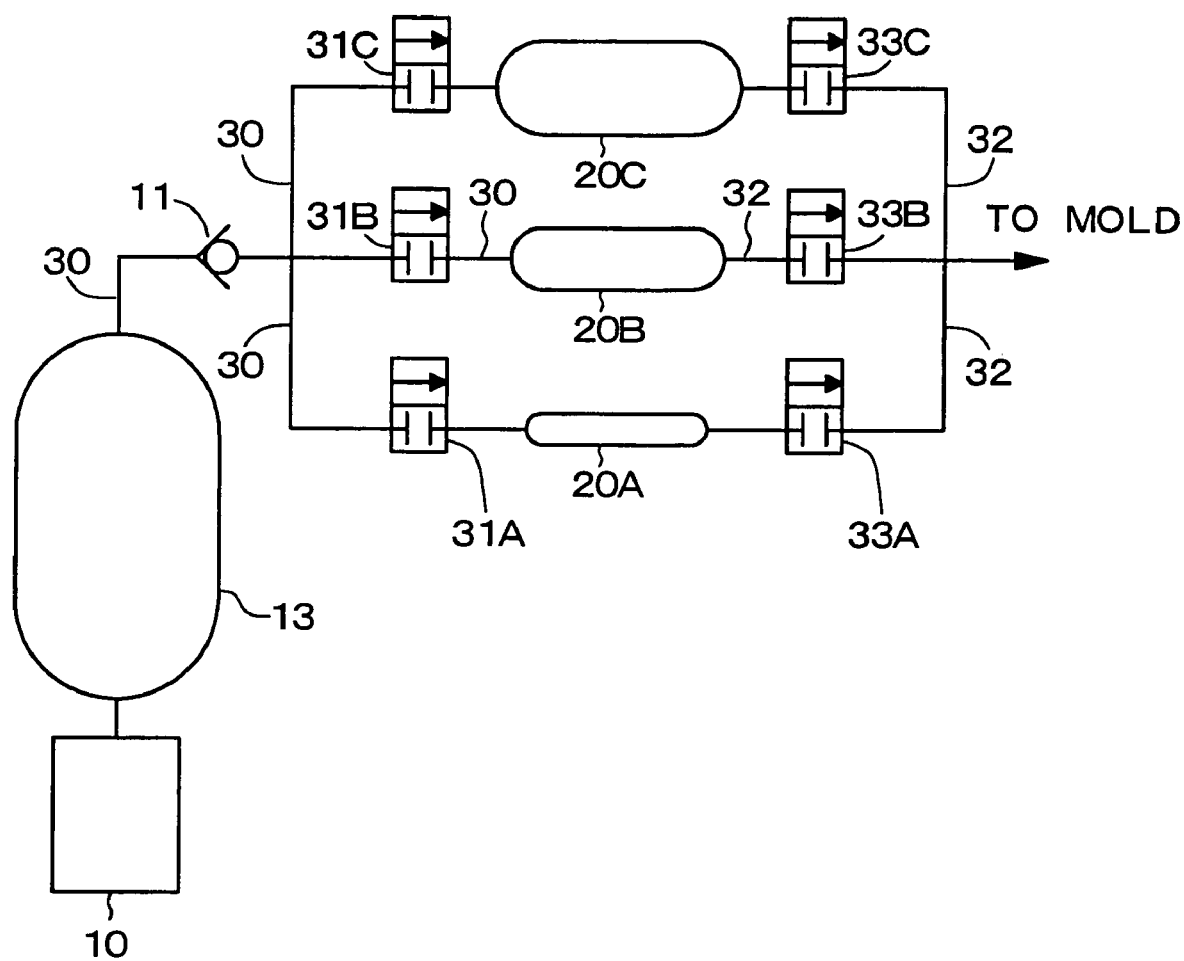
FIG. 10 is a conceptual view of an apparatus for introducing a pressurized gas in an Example 5.

Example 5 is also a variant of Example 1. As shown in FIG. 10, a pressurized-gas accumulation tank 13 having a volume greater than the total volume of the measuring tanks 20A, 20B and 20C is disposed in the first pressurized-gas supply-line 30 between the pressurized-gas supply valves 31A, 31B and 31C and the pressurized-gas supply-source 10 (more specifically, between a check valve 11 and the pressurized-gas supply-source 10).

Figure 11:
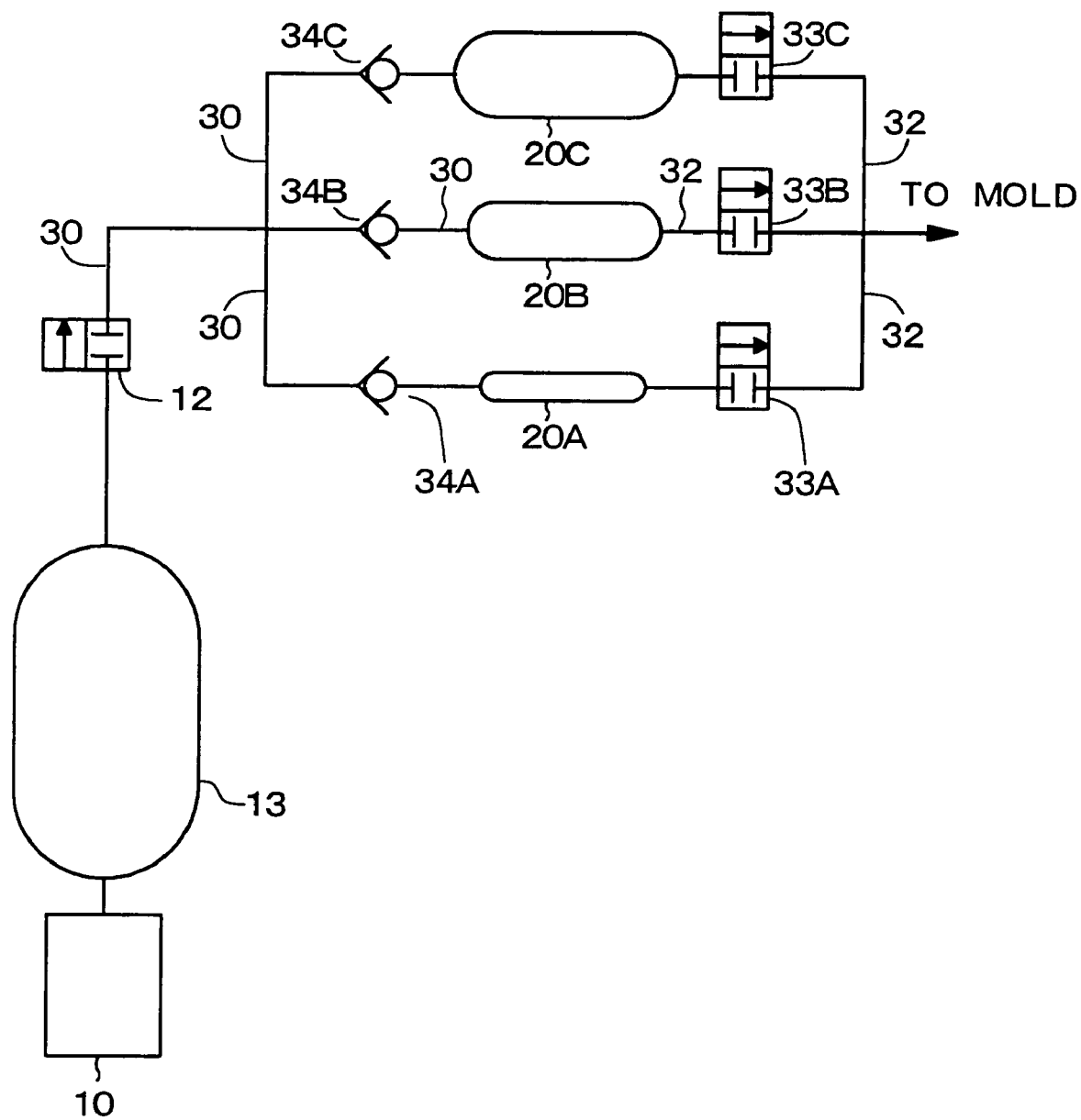
FIG. 11 is a conceptual view of a variant of the apparatus for introducing a pressurized gas in Example 5.

Alternatively, a variant of Example 4 can be employed. That is, as shown in FIG. 11, there can be employed a constitution in which a pressurized-gas accumulation tank 13 having a volume greater than the total volume of the measuring tanks 20A, 20B and 20C is disposed in the first pressurized-gas supply-line 30 between the pressurized-gas supply valve 12 and the pressurized-gas supply-source 10.

The other constitution of the apparatus for introducing a pressurized gas can be made in the same manner as in Example 1 or 4 except for the above point, so that the detailed explanation thereof is omitted. Further, the injection molding method can also be the same as that in Example 1 or 4, and further, can be the same as that in Example 2 or 3, so that the detailed explanation thereof is omitted.

Example 6

Figure 12A:
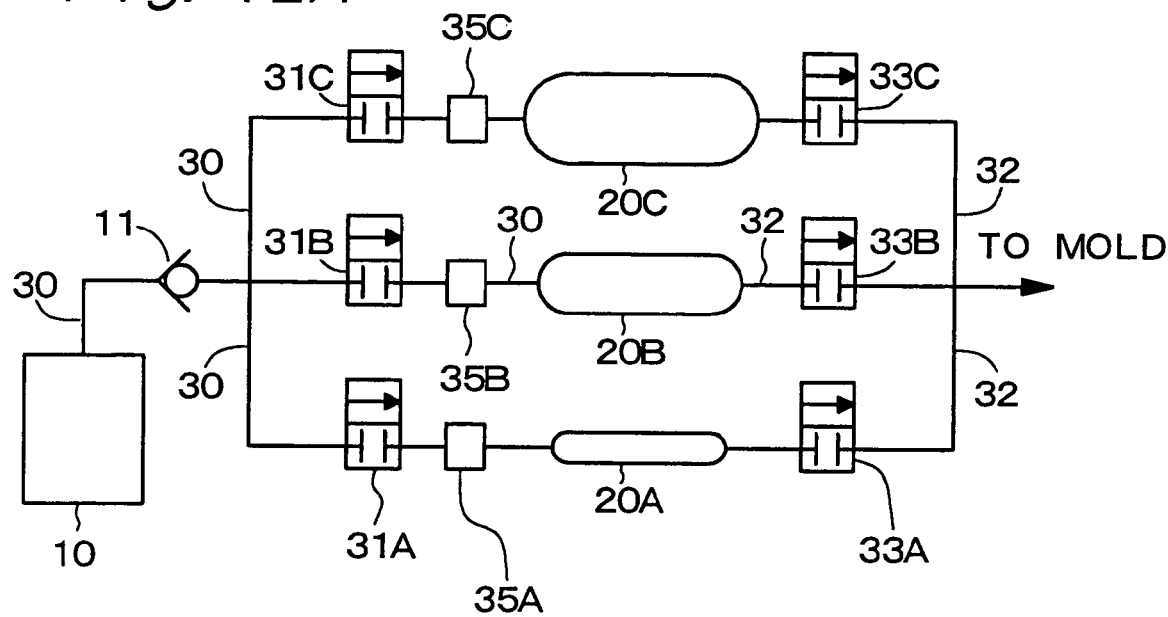
FIGS. 12A and 12B are conceptual views of an apparatus for introducing a pressurized gas in an Example 6.

Example 6 is also a variant of Example 1. In Example 6, as shown in FIG. 12A, pressure-regulating valves 35A, 35B and 35C are disposed somewhere in the three first pressurized-gas supply-lines 30, and further, for each measuring tank 20A, 20B and 20C.

Figure 12B:
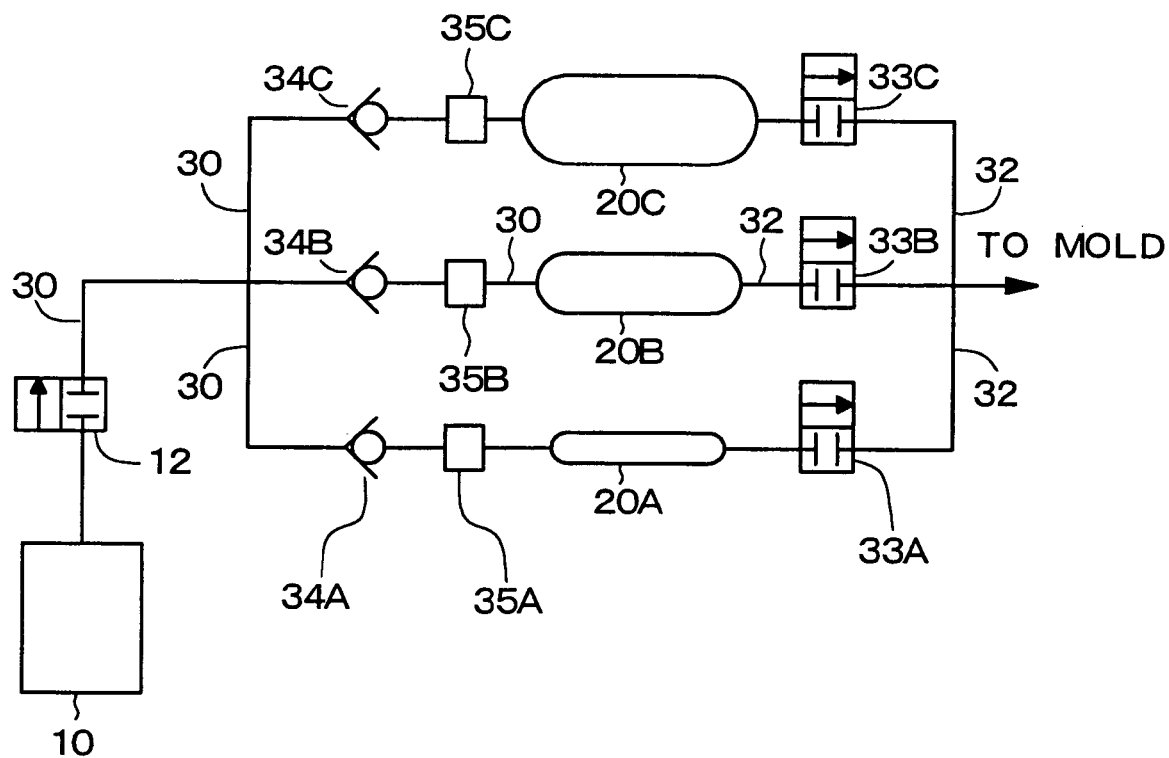

Alternatively, a variant of Example 4 can be also employed. That is, as shown in FIG. 12B, there can be employed a constitution in which pressure-regulating valves 35A, 35B and 35C are disposed somewhere in the three first pressurized-gas supply-lines 30, and further, for each measuring tank 20A, 20B and 20C.

When the pressure-regulating valves 35A, 35B and 35C are disposed as described above, the pressure of the pressurized gas to be introduced into the molten resin in the cavity can be optimized, and the pressurized gas can be efficiently used. That is, for example, there can be employed a constitution in which a high-pressure pressurized gas is introduced from certain measuring tank(s) in the initial stage of introducing the pressurized gas into the molten resin in the cavity, and after the initial stage, a relatively low-pressure pressurized gas is introduced from the other measuring tank(s).

Figure 13:
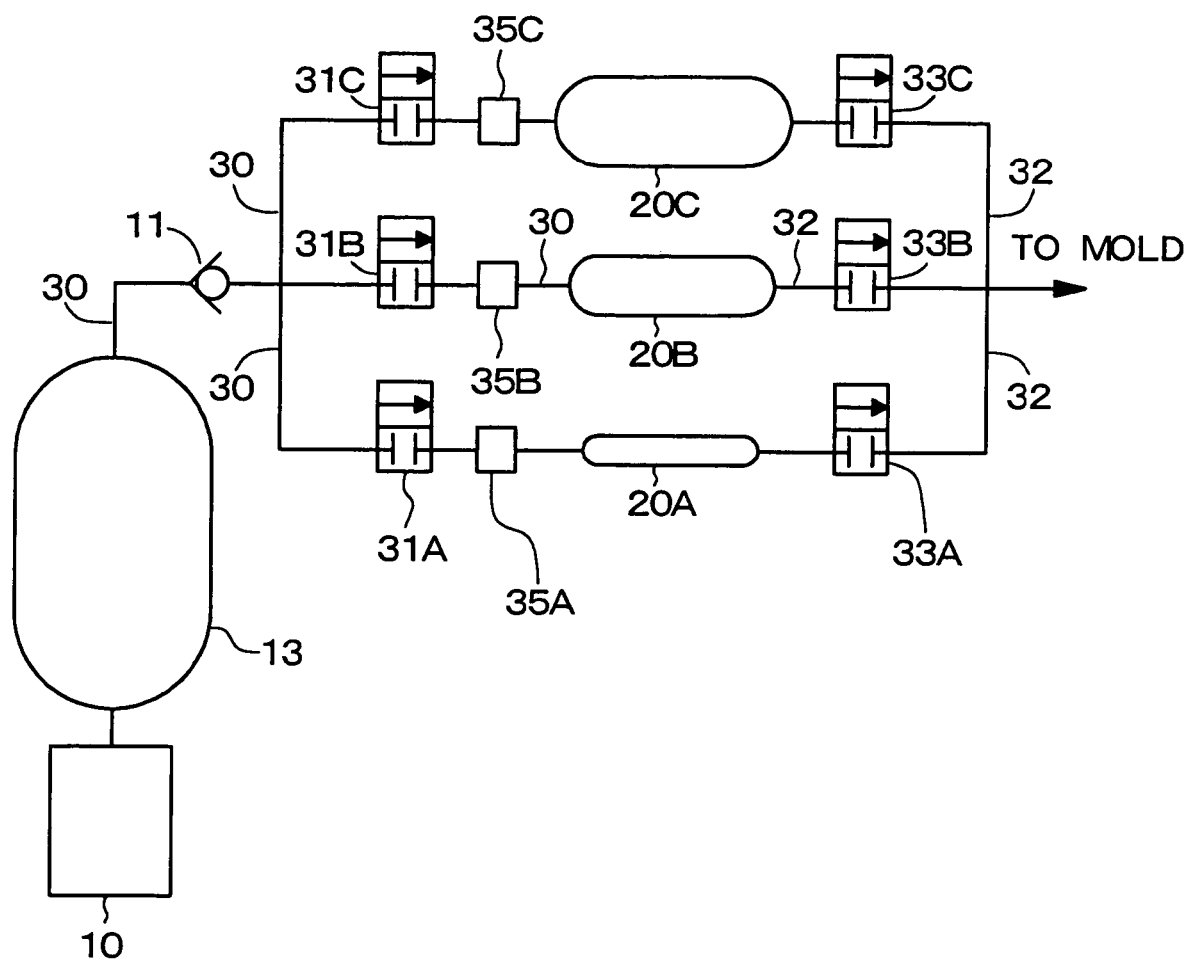
FIG. 13 is a conceptual view of a variant of the apparatus for introducing a pressurized gas in Example 6.
Figure 14:
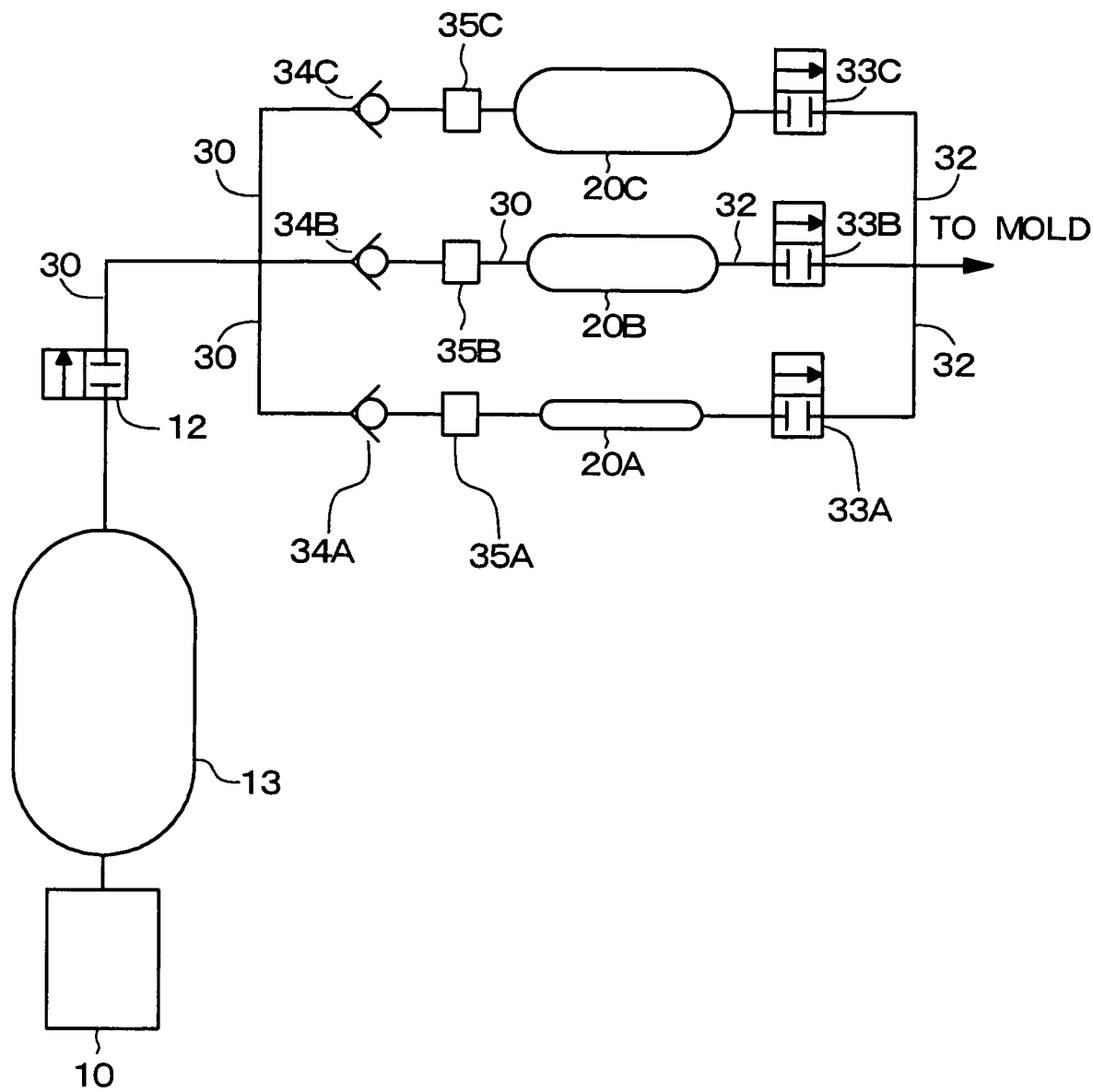
FIG. 14 is a conceptual view of another variant of the apparatus for introducing a pressurized gas in Example 6.

In addition, as shown in FIG. 13, there can be employed a constitution in which a pressurized-gas accumulation tank 13 having a volume greater than the total volume of the measuring tanks 20A, 20B and 20C is disposed in the first pressurized-gas-supply-line 30 between the pressurized-gas supply valves 31A, 31B and 31C and the pressurized-gas-supply-source 10 (more specifically, between the check valve 11 and the pressurized-gas supply-source 10). As shown in FIG. 14, there can be also employed a constitution in which a pressurized-gas accumulation tank 13 having a volume greater than the total volume of the measuring tanks 20A, 20B and 20C is disposed in the first pressurized-gas supply-line 30 between the pressurized-gas supply valve 12 and the pressurized-gas supply-source 10.

The other constitution of the apparatus for introducing a pressurized gas can be made in the same manner as in Example 1 or 4, so that the detailed explanation thereof is omitted. Further, the injection molding method can be also the same as that in Example 1 or 4, and further, can be the same as that in Example 2 or 3, so that the detailed explanation thereof is omitted.

Example 7

Figure 15A:
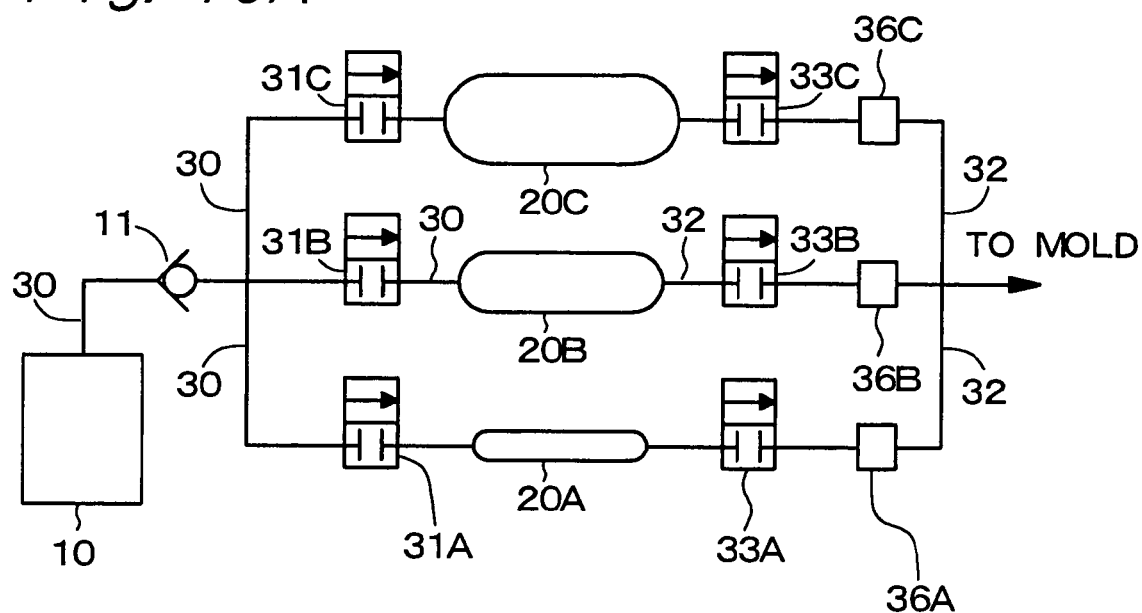
FIGS. 15A and 15B are conceptual views of an apparatus for introducing a pressurized gas in an Example 7.

Example 7 is also a variant of Example 1. In Example 7, as shown in FIG. 15A, flow-regulating valves 36A, 36B and 36C are disposed somewhere in the second pressurized-gas supply-lines 32, and further, for each measuring tank 20A, 20B and 20C, whereby the introduction rate of the pressurized gas to be introduced into the molten resin in the cavity can be optimized. That is, for example, there can be employed a constitution in which the pressurized gas is introduced at a low speed from a certain measuring tank(s) in the initial stage of introducing the pressurized gas into the molten resin in the cavity, and after the initial stage, the pressurized gas is introduced at a high speed with the other measuring tank(s).

Figure 15B:
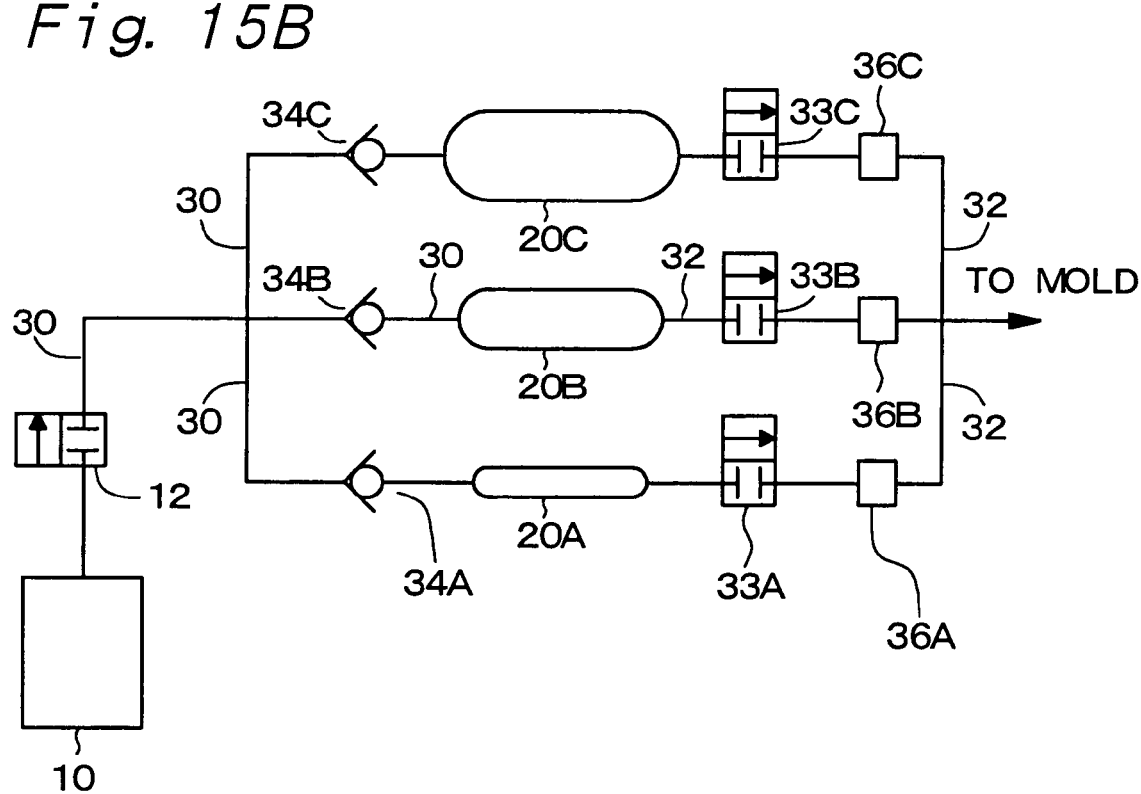

Alternatively, as shown in FIG. 15B, a variant of Example 4 can be also employed.

The other constitution of the apparatus for introducing a pressurized gas can be made in the same manner as in Example 1 or 4, so that the detailed explanation thereof is omitted. Further, the injection molding method can also be the same as that in Example 1 or 4, and further, can be the same as that in Example 2 or 3, so that the detailed explanation thereof is omitted.

Further, there can also be employed a constitution that is explained in Example 5 in which the pressurized-gas accumulation tank is disposed, and the pressure-regulating valves 35A, 35B and 35C explained in Example 6 can be also applied to Example 7.

Example 8

Figure 16:
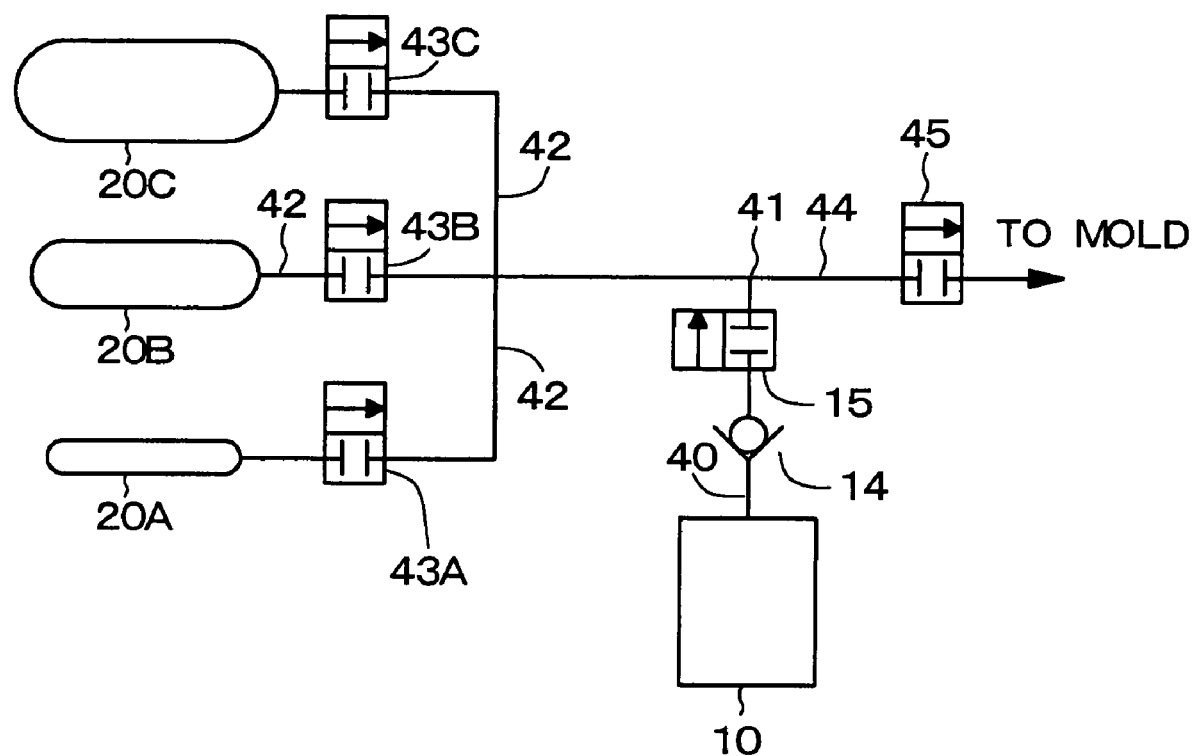
FIG. 16 is a conceptual view of an apparatus for introducing a pressurized gas in an Example 8.

Example 8 is concerned with the apparatus for introducing a pressurized gas and the injection molding method according to the second aspect of the present invention. FIG. 16 shows a conceptual view of the apparatus for introducing a pressurized gas in Example 8.

This apparatus for introducing a pressurized gas is an apparatus for introducing a pressurized gas for use in an injection molding method in which a molten resin is injected into a cavity provided in a mold that is not shown and a pressurized gas is introduced into the molten resin in the cavity to produce a molded article having a hollow portion.

And, the apparatus for introducing a pressurized gas comprises;

(A) a pressurized-gas supply-source 10, (B) a plurality of measuring tanks 20A, 20B and 20C, (C) a first pressurized-gas supply-line 40 connected to the pressurized-gas supply-source 10, (D) a second pressurized-gas supply-line 42 that is connected to a terminal 41 of the first pressurized-gas supply-line 40 and that is for supplying the pressurized gas (specifically, a pressurized nitrogen gas) to each measuring tank 20A, 20B and 20C from the pressurized-gas supply-source 10, (E) a third pressurized-gas supply-line 44 that is connected to the terminal of the first pressurized-gas supply-line 40 and communicates with the second pressurized-gas supply-line 42 and that is for introducing the pressurized gas into the molten resin in the cavity from the measuring tank 20A, 20B and 20C, (F) a pressurized-gas supply valve 15 disposed somewhere in the first pressurized-gas supply-line 40, (G) pressurized-gas supply/discharge-control valves 43A, 43B and 43C disposed somewhere in the second pressurized-gas supply-line 42, and (H) a pressurized-gas discharge valve 45 disposed somewhere in the third pressurized-gas supply-line 44.

In Example 8, the number of the measuring tanks is 3, while the number thereof shall not be limited thereto.

In Example 8, the number of the second pressurized-gas supply-line 42 connected to the terminal 41 of the first pressurized-gas supply-line 40 is one, and it is branched to three second pressurized-gas supply-lines 42 at the end of the one second pressurized-gas supply-line 42. The pressurized-gas supply/discharge-control valves 43A, 43B and 43C are disposed in the three branched second pressurized-gas supply-lines 42. The number of the third pressurized-gas supply-line 44 connected to the terminal 41 of the first pressurized-gas supply-line 40 is one. The third pressurized-gas supply-line 44 is connected to a pressurized-gas introduction nozzle (not shown). The pressurized-gas introduction nozzle is disposed in the mold and is opened to the cavity. Further, a check valve 14 is disposed in the first pressurized-gas supply-line 40 between the pressurized-gas supply-source 10 and the pressurized-gas supply valve 15.

The volumes of the measuring tanks 20A, 20B and 20C, the form, size and volume of a molded article and the volume of a hollow portion were determined to be the same as those in Example 1.

In the apparatus for introducing a pressurized gas in Example 8, a combination of the measuring tanks 20A, 20B and 20C is as well determined on the basis of the amount of the pressurized gas to be required for forming the hollow portion in the molded article, and the open/close of the pressurized-gas supply/discharge-control valves 43A, 43B and 43C disposed in the second pressurized-gas supply-lines 42 is controlled on the basis of the above determination. In Example 8, specifically, the measuring tanks 20A and 20B are used.

The injection molding method in Example 8 will be explained below with reference to FIGS. 17A and 17B and FIGS. 18A and 18B.

[Step-800]

Figure 17A:
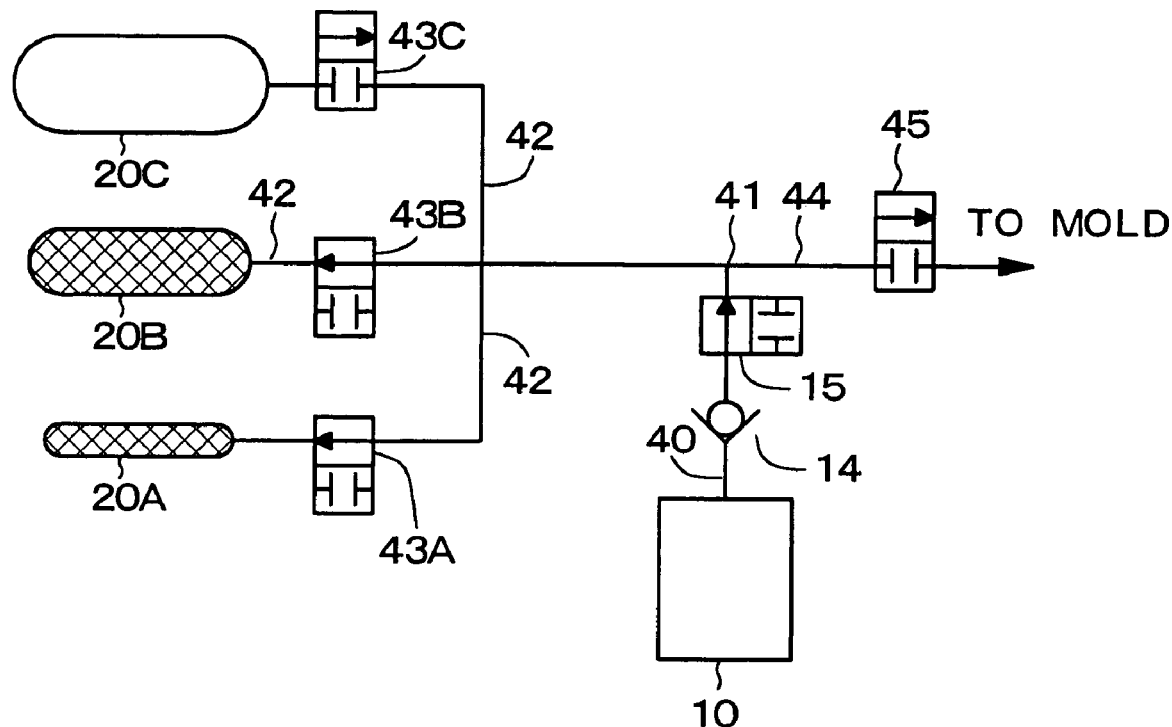
FIGS. 17A and 17B are conceptual views of an apparatus for introducing a pressurized gas, which are for explaining an injection molding method in Example 8.
Figure 17B:
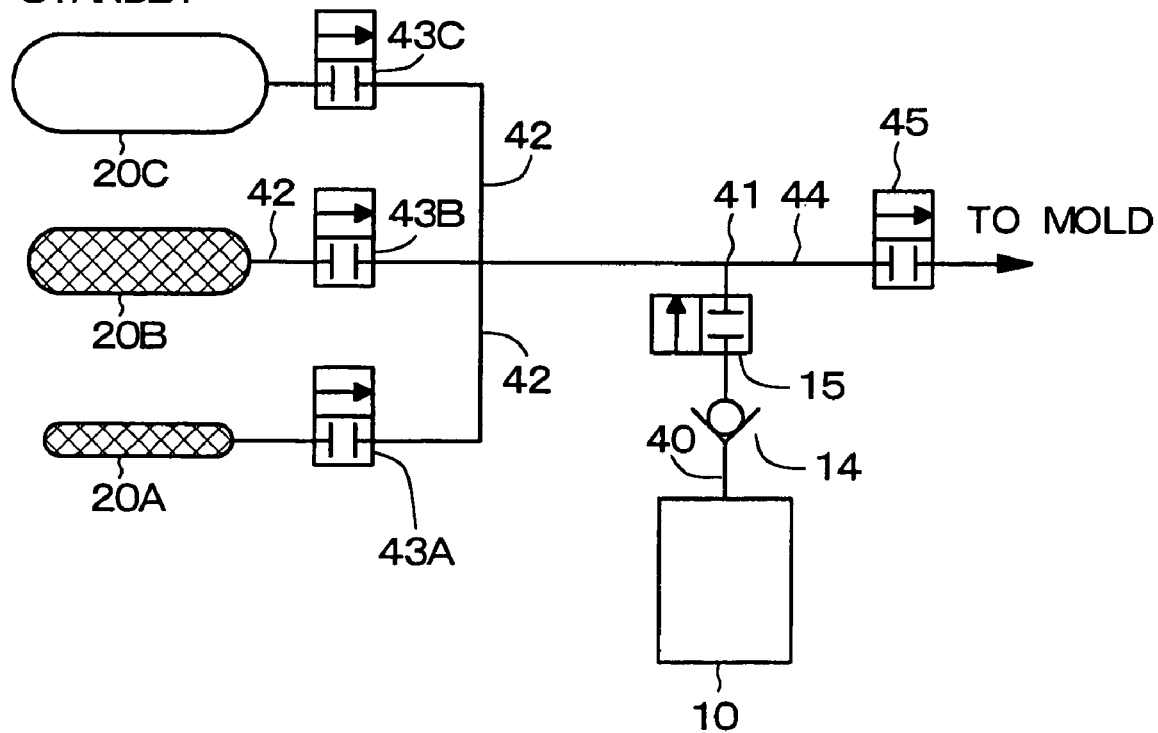

As shown in FIG. 17A, the pressurized-gas discharge valve 45 is brought in to a closed state and the pressurized-gas supply/discharge-control valves 43A and 43B and the pressurized-gas supply valve 15 are brought into an open state, to supply the pressurized gas to the measuring tanks 20A and 20B combined. After completion of the supply, the pressurized-gas supply/discharge-control valves 43A and 43B and the pressurized-gas supply valve 15 are brought into a close state (see FIG. 17B). The pressurized gas in the measuring tanks 20A and 20B was arranged to have the same pressure as that in Example 1.

[Step-810]

In this state, the molten resin is injected into the cavity provided in the mold in the same manner as in [Step-110] of Example 1.

[Step-820]

Figure 18A:
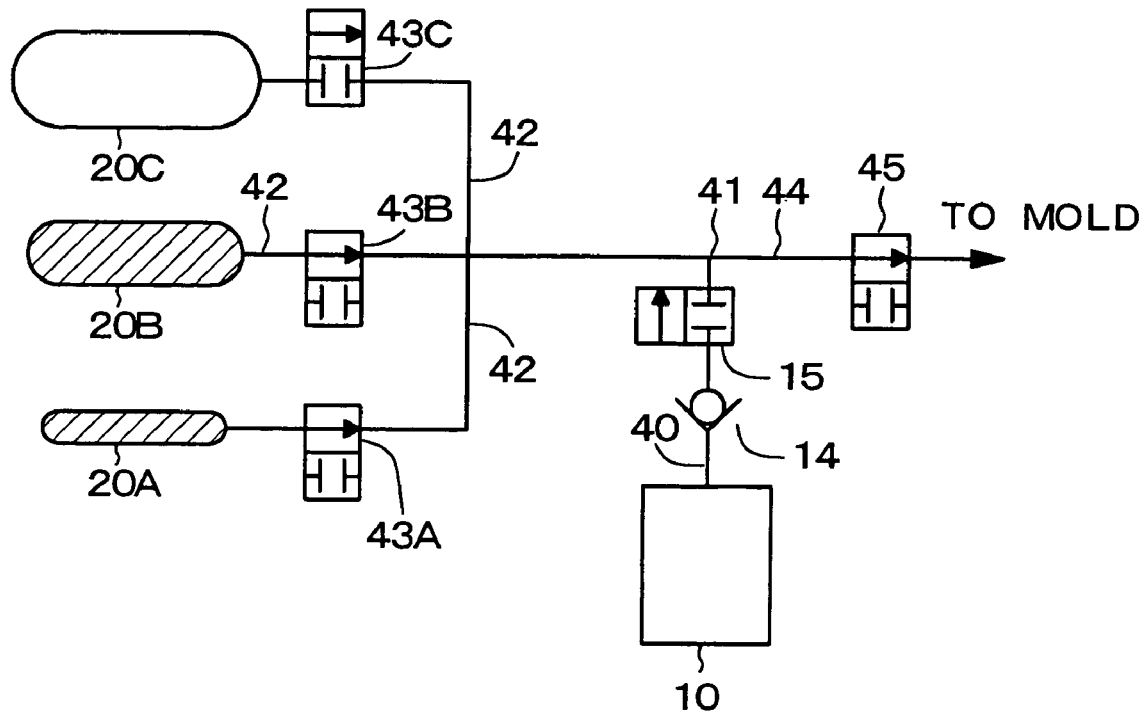
FIGS. 18A and 18B, following
Figure 18B:
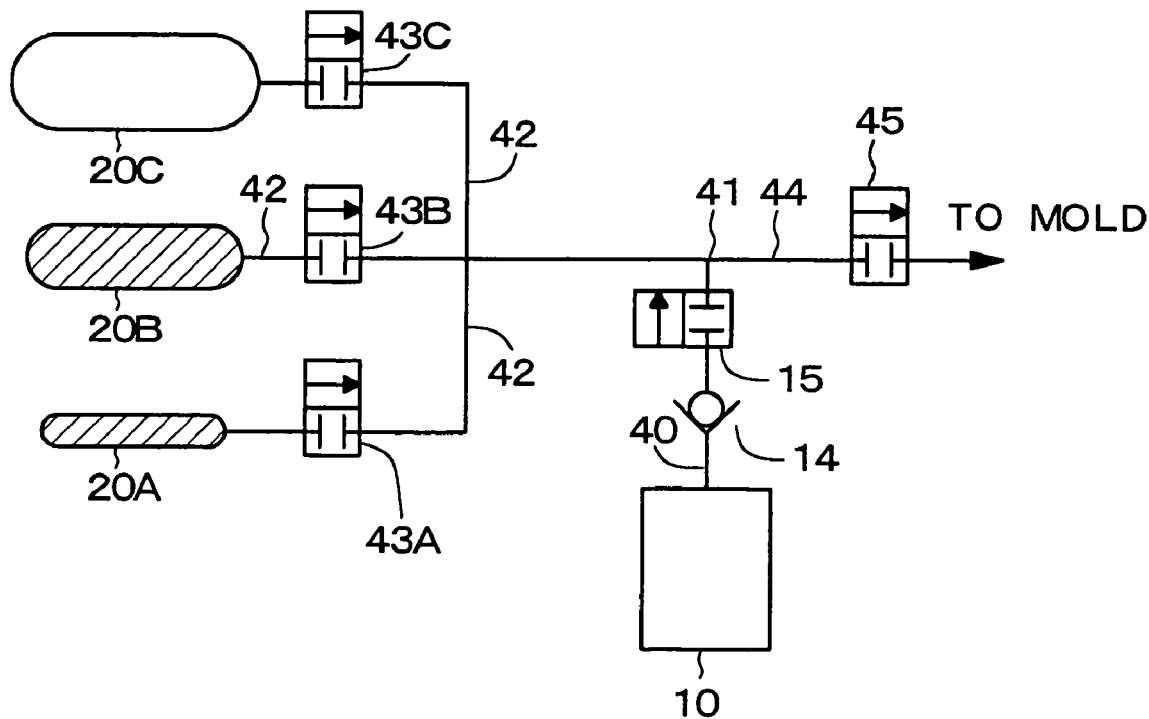

Upon completion of injection of the molten resin, the pressurized-gas supply/discharge-control valves 43A and 43B disposed in the second pressurized-gas supply-lines 42 are brought into an open state and the pressurized-gas discharge valve 45 disposed in the third pressurized-gas supply-line 44 are brought into an open state on the basis of the above determination. The pressurized-gas supply/discharge-control valves 43A and 43B are simultaneously brought into an open state. This state is shown in FIG. 18A. The pressurized gas accumulated in the measuring tanks 20A and 20B is thereby introduced into the molten resin in the cavity through the second pressurized-gas supply-lines 42, the third pressurized-gas supply-line 44 and the pressurized-gas introduction nozzle, to form the hollow portion.

[Step-830]

Then, in the same manner as in [Step-130] of Example 1, the pressurized-gas supply/discharge-control valves 43A and 43B and the pressurized-gas discharge valve 45 were brought into a close state (see FIG. 18B), the pressurized gas in the hollow portion was released into atmosphere, the mold is opened, and the molded article was taken out of the mold. The molded article had a desired hollow portion formed.

Example 9

Figure 19A:
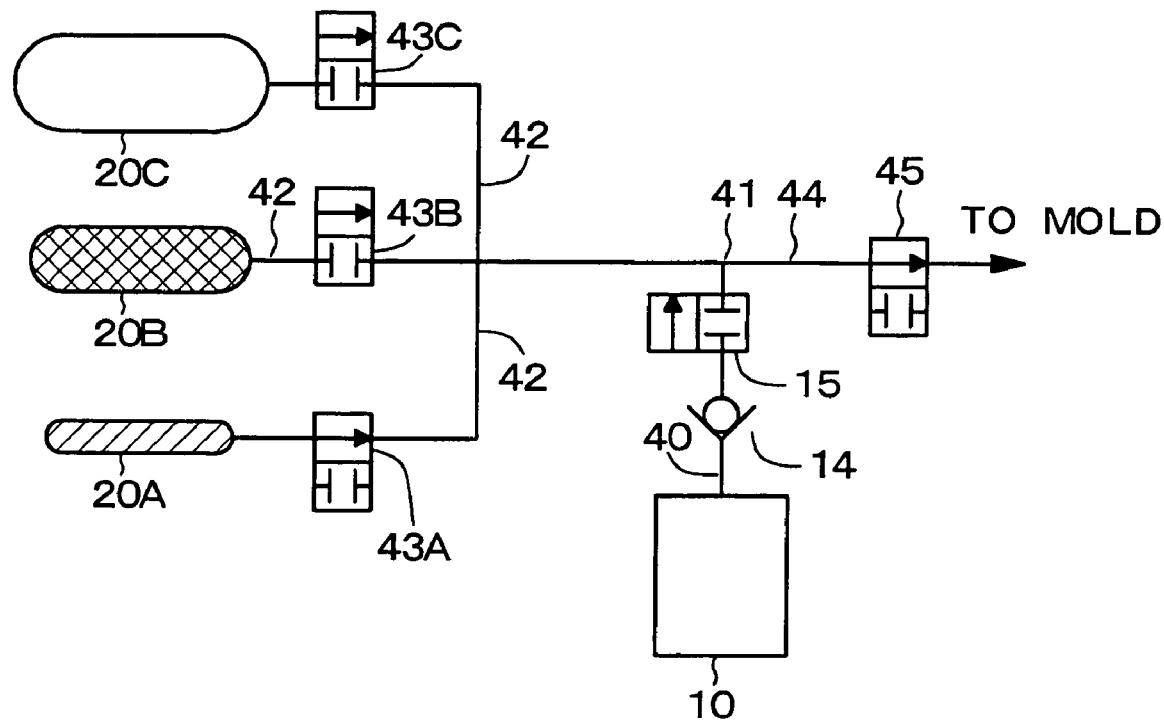
FIGS. 19A and 19B are conceptual views of an apparatus for introducing a pressurized gas, which are for explaining an injection molding method in an Example 9.
Figure 19B:
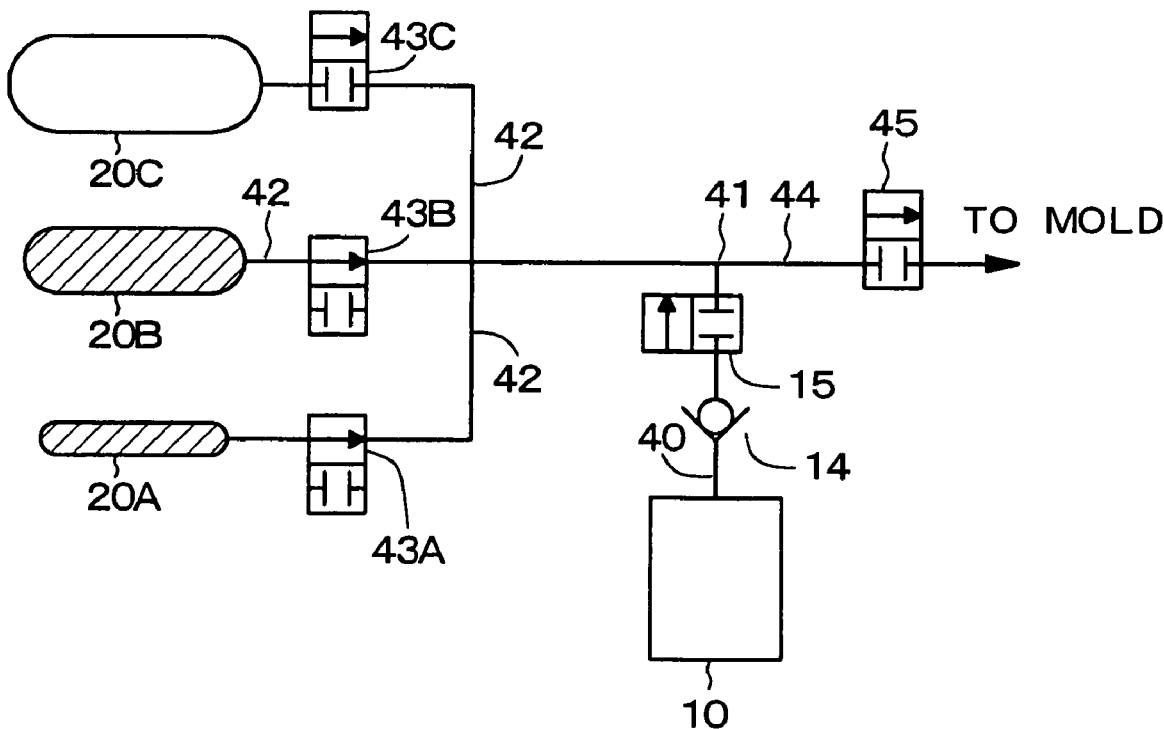

Example 9 is a variant of Example 8. In Example 8, the pressurized-gas supply/discharge-control valves 43A and 43B were simultaneously brought into an open state in [Step-820]. In Example 9, the pressurized-gas supply/discharge-control valves 43A and 43B are not simultaneously brought into an open state. That is, the pressurized-gas supply/discharge-control valves 43A and 43B are brought into an open state one after the other. Specifically, upon completion of injection of the molten resin, the pressurized-gas supply/discharge-control valve 43A disposed in the second pressurized-gas supply-line 42 is first brought into an open state, and the pressurized-gas discharge valve 45 disposed in the third pressurized-gas supply-line 44 is brought into an open state, on the basis of the previous determination (see FIG. 19A). In 5 seconds after the pressurized-gas supply/discharge-control valve 43A is brought into an open state, the pressurized-gas supply/discharge-control valve 43B disposed in the second pressurized-gas supply-line 42 is brought into an open state (see FIG. 19B), whereby an effect similar to the effect explained in Example 2 can be obtained.

Example 10

Figure 20A:
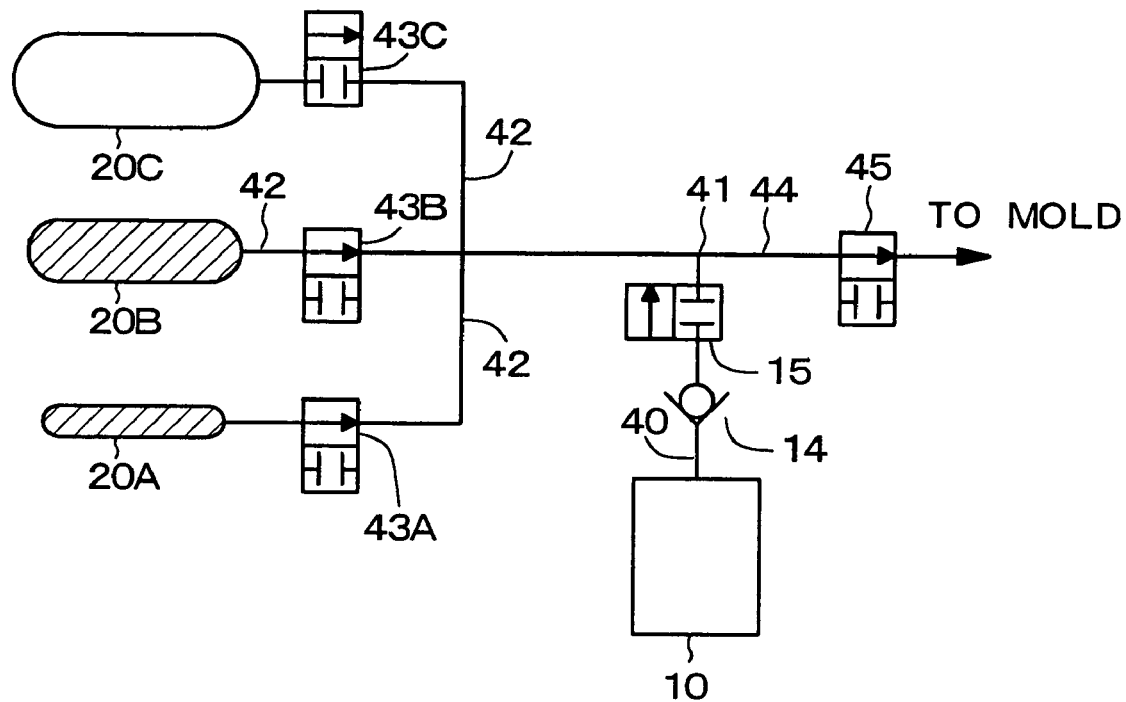
FIGS. 20A and 20B are conceptual views of an apparatus for introducing a pressurized gas, which are for explaining an injection molding method in an Example 10.
Figure 20B:
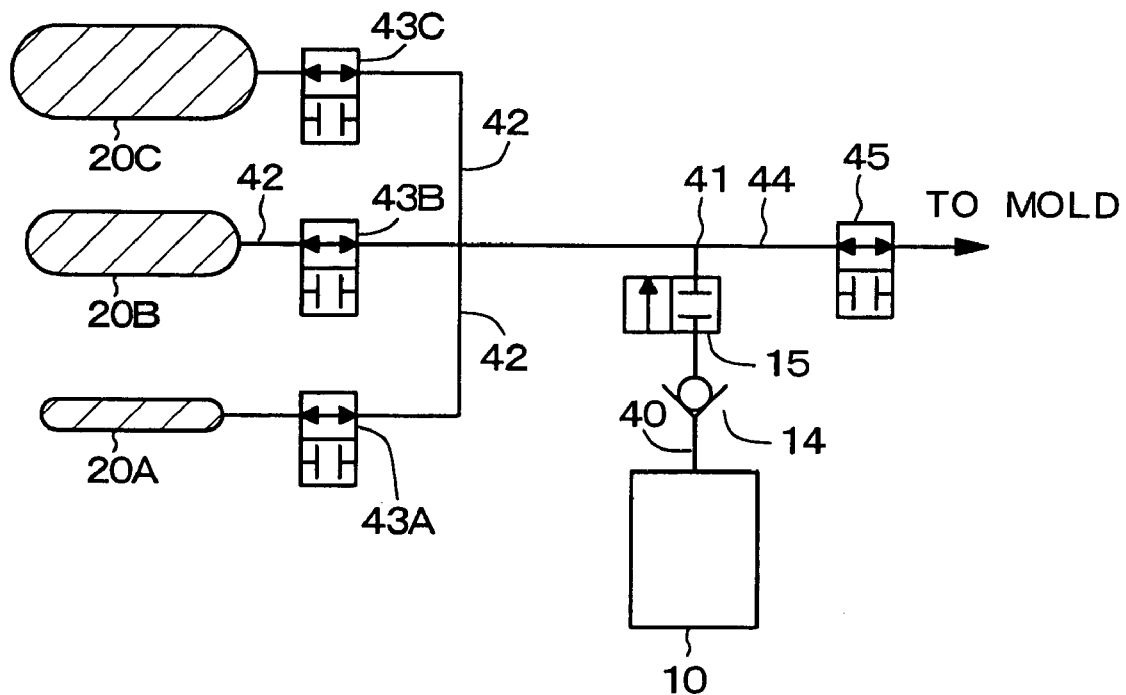
Figure 21:
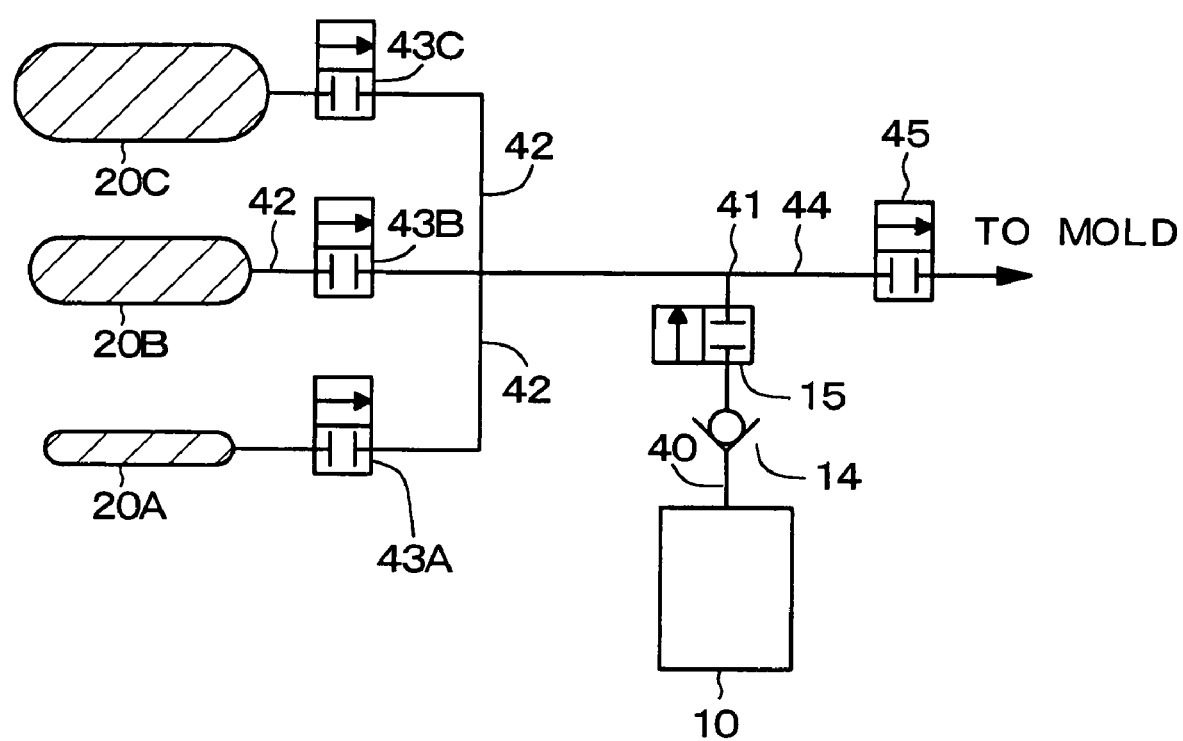
FIG. 21, following

Example 10 is also a variant of Example 8. In Example 8, the pressurized gas in the hollow portion was released into atmosphere in [Step-830]. On the other hand, in Example 10, the pressurized gas in the hollow portion is recovered into the measuring tanks 20C. Specifically, 25 seconds after the initiation of injection of the molten resin, the pressurized-gas supply/discharge-control valve 43C is brought into an open state to recover the pressurized gas in the hollow portion formed in the resin in the cavity into the measuring tank 20C. FIGS. 20A and 20B show a state found before the pressurized-gas supply/discharge-control valve 43C is brought into an open state and a state found after it is brought into an open state. And, in 30 seconds after the initiation of injection of the molten resin, the pressurized-gas supply/discharge-control valves 43A, 43B and 43C were brought into a closed state (see FIG. 21), and 31 seconds after the initiation of injection of the molten resin, the pressurized gas in the hollow portion was released into the atmosphere. In 60 seconds after the initiation of injection of the molten resin, the mold was opened, and the molded article was taken out of the mold. The molded article had a desired hollow portion formed. The pressurized gas in the measuring tank 20C can be recycled to the pressurized-gas supply-source 10 through a recycle line that is not shown.

Example 11

Figure 22:
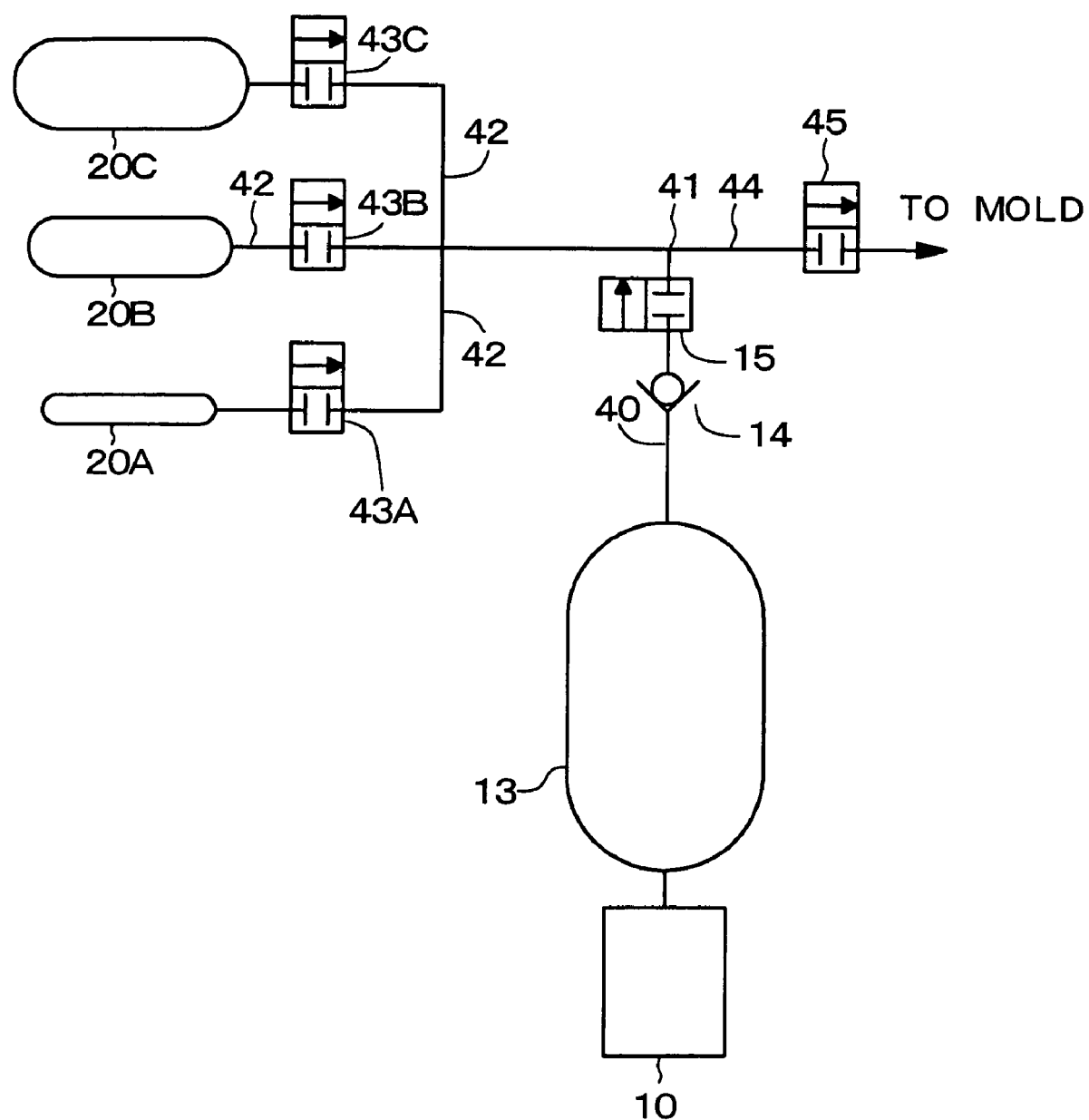
FIG. 22 is a conceptual view of an apparatus for introducing a pressurized gas in an Example 11.

Example 11 is also a variant of Example 8. In Example 11, as shown in FIG. 22, a pressurized-gas accumulation tank 13 having a volume greater than the total volume of the measuring tanks 20A, 20B and 20C is disposed in the first pressurized-gas supply-line 40 between the pressurized-gas supply valve 15 and the pressurized-gas supply-source 10 (more specifically, between the check valve 14 and the pressurized-gas supply-source 10).

The other constitution of the apparatus for introducing a pressurized gas can be made in the same manner as in Example 8 except for the above point, so that the detailed explanation thereof is omitted. Further, the injection molding method can be the same as that in Example 8 or Example 9 or 10, so that the detailed explanation thereof is omitted.

Example 12

Figure 23:
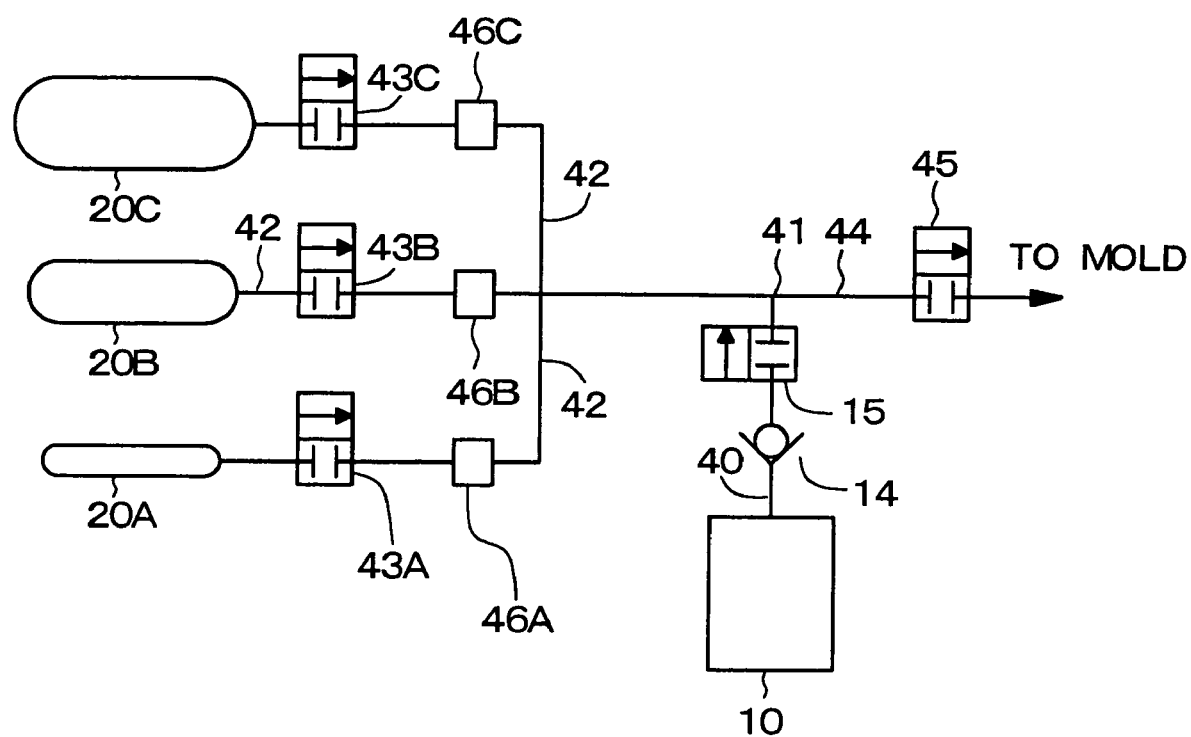
FIG. 23 is a conceptual view of an apparatus for introducing a pressurized gas in an Example 12.

Example 12 is also a variant of Example 8. In Example 12, as shown in FIG. 23, the pressure-regulating valves 46A, 46B and 46C are disposed somewhere in the three second pressurized-gas supply-lines 42, and further, for each measuring tank 20A, 20B and 20C.

When the pressure-regulating valves 46A, 46B and 46C are disposed as described above, the pressure of the pressurized gas to be introduced into the molten resin in the cavity can be optimized, and the pressurized gas can be efficiently used. That is, for example, there can be employed a constitution in which a high-pressure pressurized gas is introduced from certain measuring tank(s) in the initial stage of introducing the pressurized gas into the molten resin in the cavity, and after the initial stage, a relatively low-pressure is introduced from other measuring tank(s).

Figure 24:
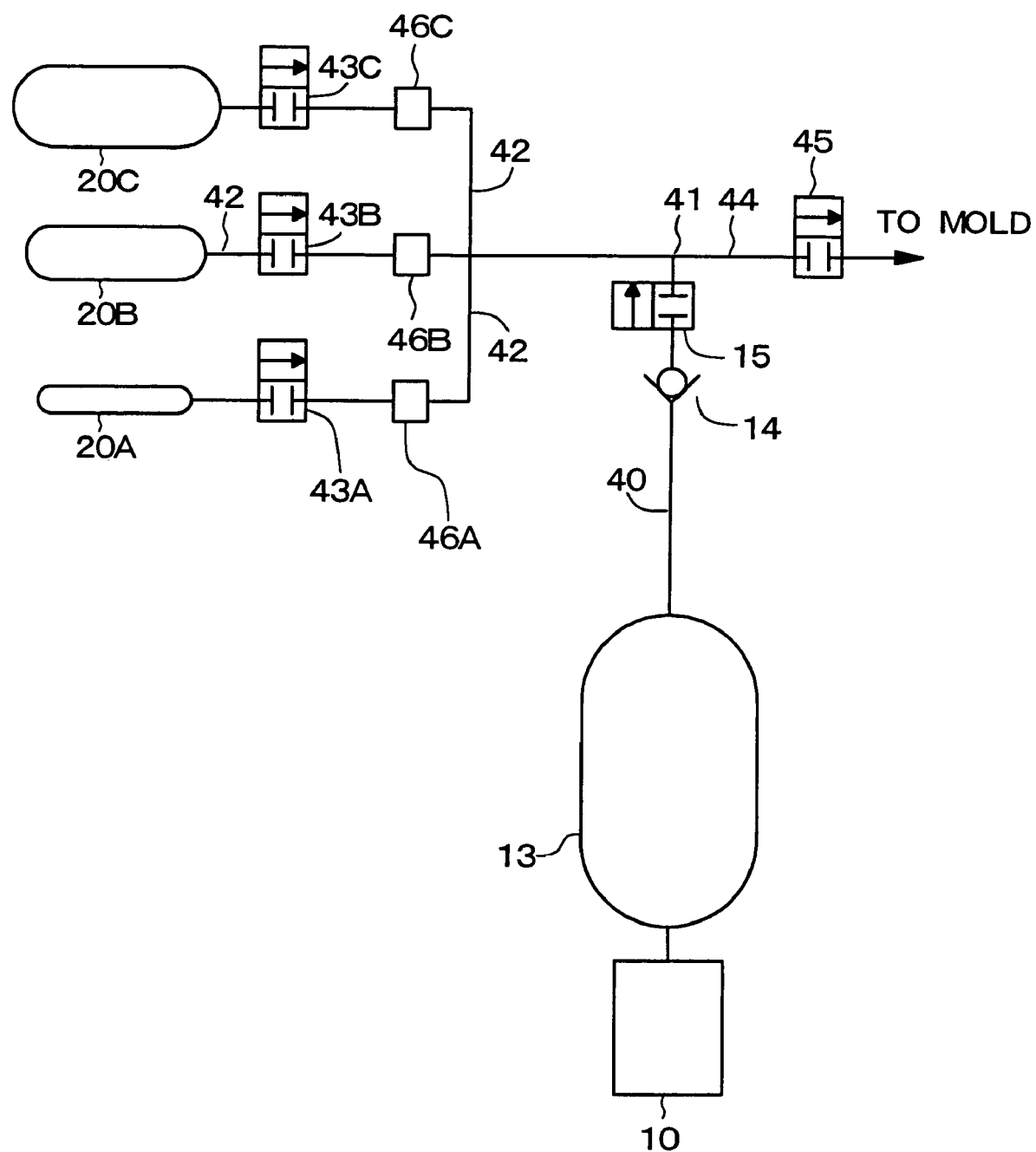
FIG. 24 is a conceptual view of a variant of the apparatus for introducing a pressurized gas in Example 12.

As shown in FIG. 24, there may be employed a constitution in which a pressurized-gas accumulation tank 13 having a volume greater than the total volume of the measuring tanks 20A, 20B and 20C is disposed in the first pressurized-gas supply-line 40 between the pressurized-gas supply valve 15 and the pressurized-gas supply-source 10 (more specifically, between the check valve 14 and the pressurized-gas supply-source 10).

The other constitution of the apparatus for introducing a pressurized gas can be made in the same manner as in Example 8, so that the detailed explanation thereof is omitted.

Further, the injection molding method can be also the same as those in Examples 8 to 10, so that the detailed explanation thereof is omitted.

Example 13

Figure 25:
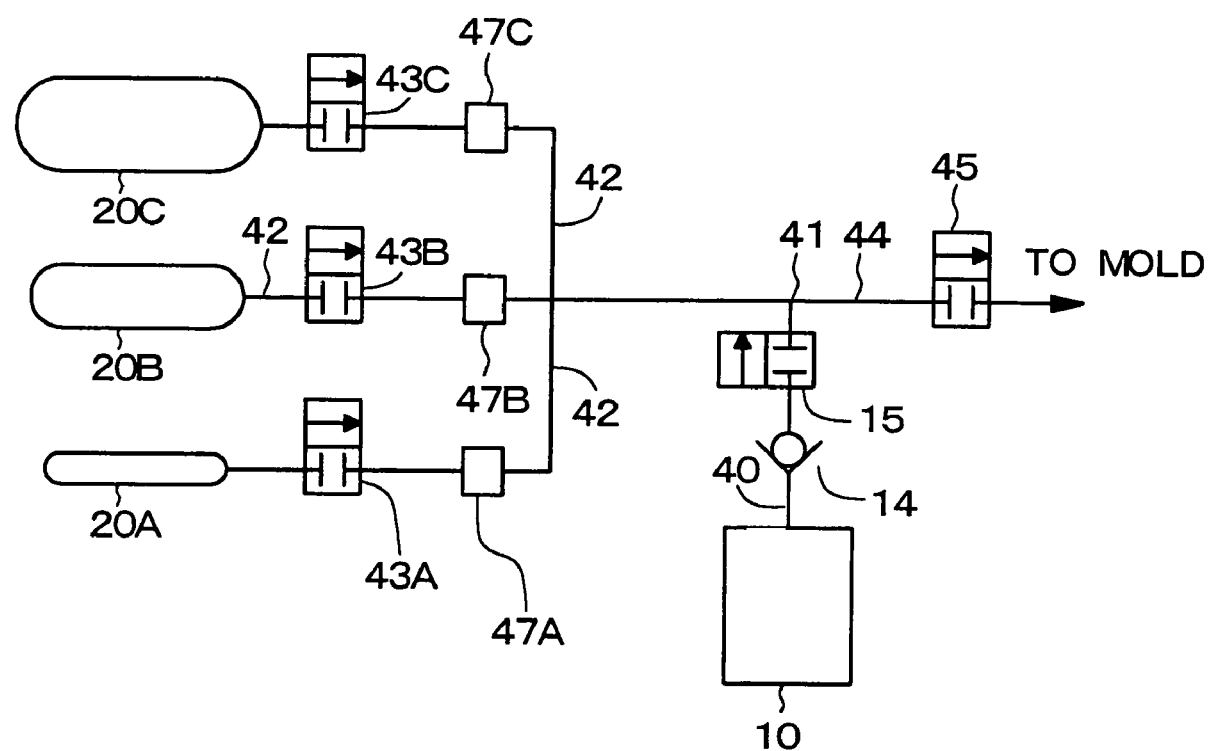
FIG. 25 is a conceptual view of an apparatus for introducing a pressurized gas in an Example 13.

Example 13 is also a variant of Example 8. In Example 13, as shown in FIG. 25, the flow-regulating valves 47A, 47B and 47C are disposed somewhere in the second pressurized-gas supply-lines 42, and further, for each measuring tank 20A, 20B and 20C. As a result, the introduction speed of the pressurized gas to be introduced into the molten resin in the cavity can be thereby optimized. That is, for example, there can be employed a constitution in which the pressurized gas is introduced at a low speed from certain measuring tank(s) in the initial stage of introducing the pressurized gas into the molten resin in the cavity, and after the initial stage, the pressurized gas is introduced at a relatively high speed from other measuring tank(s).

The other constitution of the apparatus for introducing a pressurized gas can be made in the same manner as in Example 8, so that the detailed explanation thereof is omitted. Further, the injection molding method can also be the same as those in Examples 8 to 10, so that the detailed explanation thereof is omitted.

Further, there can be employed the constitution explained in Example 11 in which the pressurized-gas accumulation tank 13 is disposed. Further, as explained in Example 12, the pressure-regulating valves 46A, 46B and 46C may be disposed somewhere in the three second pressurized-gas supply-lines 42, and further, for each measuring tank 20A, 20B and 20C.

Figure 26:
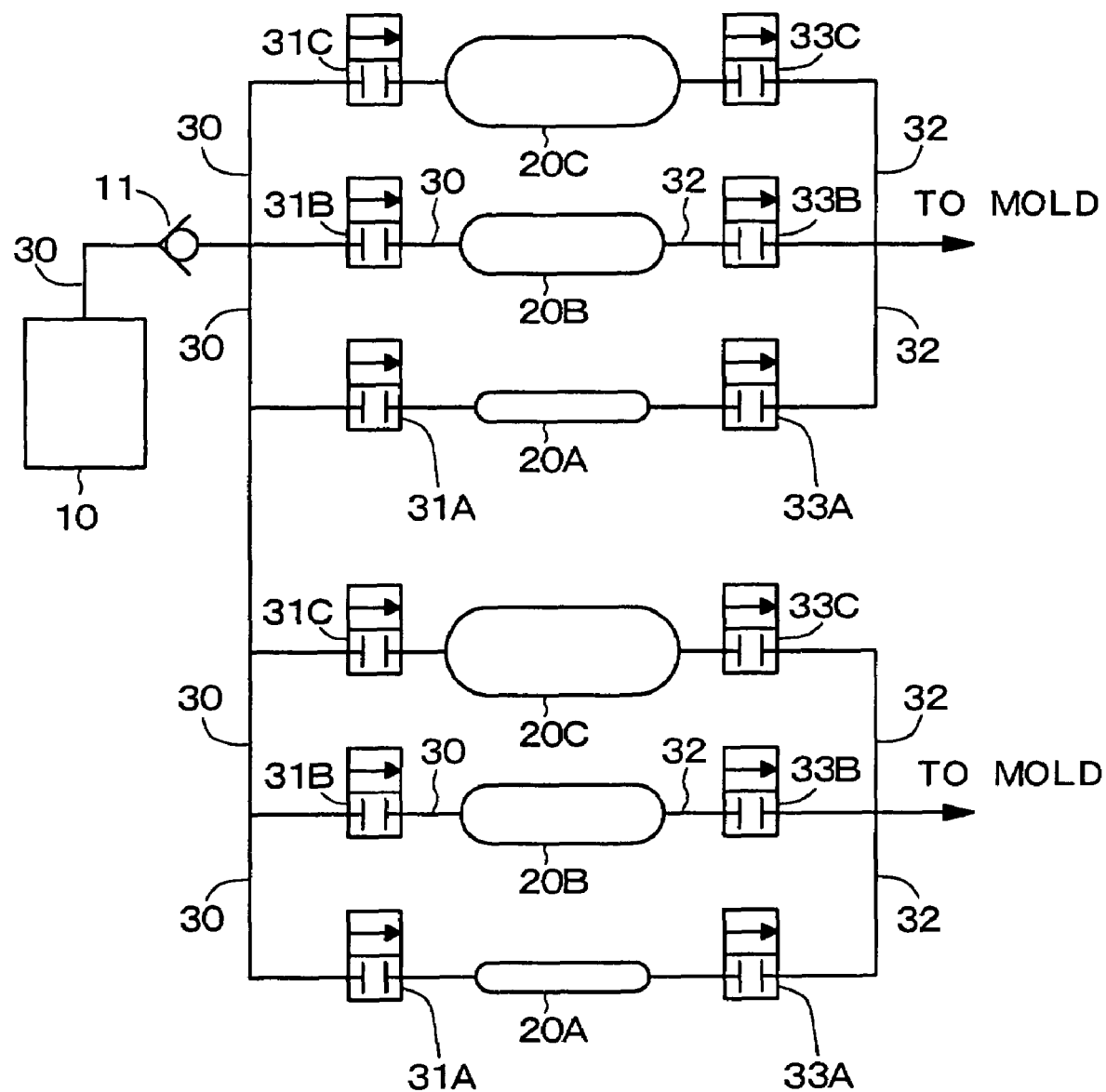
FIG. 26 is a conceptual view showing a constitution in which a pressurized gas is supplied to a plurality of molds (two molds in a shown embodiment) with one apparatus for introducing a pressurized gas.

The present invention has been explained hereinabove on the basis of Examples, while the present invention shall not be limited thereto or by them. The structures of the apparatus for introducing a pressurized gas explained in Examples and the thermoplastic resin, the injection conditions and the size of the molded article in Examples are given as examples and can be changed and altered as required. Examples have explained the constitutions in which the pressurized gas is supplied to one mold with one apparatus for introducing a pressurized gas, while the present invention shall not be limited to such a constitution. FIG. 26 shows a constitution in which the pressurized gas is supplied to a plurality of molds (two molds in an example shown) with one apparatus for introducing a pressurized gas. While FIG. 26 shows the apparatus for introducing a pressurized gas used in Example 1, the apparatus for introducing a pressurized gas in any other Example can be naturally used.

In the present invention, although the constitution and structure of the apparatus for introducing a pressurized gas is simple, a predetermined volume of the pressurized gas required for forming the hollow portion in the molded article can be reliably introduced into the molten resin in the cavity. Further, the consumption amount of the gas can be minimized, which is economical. Furthermore, regardless of the volumes of molded articles, various molded article can be produced with one injection molding machine including the apparatus for introducing a pressurized gas. Further, there is used no piston-type compressor having a cylinder like the measuring method, which makes maintenance easy and decreases energy in consumption.

The invention claimed is:

1. An injection molding method for producing a molded article having a hollow portion by injecting a molten resin into a cavity provided in a mold and introducing a pressurized gas into the molten resin in the cavity, said method comprising:

provinding an apparatus for introducing a pressurized gas, which comprises:
a pressurized-gas supply-source;
a plurality of measuring tanks, wherein each measuring tank includes a first end and a second end;
a first pressurized-gas supply-line for supplying the pressurized gas to each measuring tank from the pressurized-gas supply-source;
a pressurized-gas supply valve disposed in the first pressurized-gas supply-line;
a second pressurized-gas supply-line for introducing the pressurized gas into the molten resin in the cavity from at least one of the measuring tanks; and
a pressurized-gas discharge-control valve disposed in the second pressurized-gas supply-line,
coupling the first pressurized-gas supply-line to the first end of each measuring tank and coupling the second pressurized-gas supply-line to the second end of each measuring tank;
determining a combination of the measuring tanks in advance on a basis of an amount of pressurized gas to be required for forming the hollow portion in the molded article;
bringing the pressurized-gas discharge-control valve into a closed state and bringing the pressurized-gas supply valve into an open state to supply the pressurized gas to the determined combination of measuring tanks, and then bringing the pressurized-gas supply valve into a closed state;
injecting the molten resin into the cavity provided in the mold; and
bringing the pressurized-gas discharge-control valve disposed in the second pressurized-gas supply-line into an open state on the basis of said determining operation, to introduce the pressurized gas into the molten resin in the cavity for forming the hollow portion, wherein the pressurized-gas discharge-control valve comprises a plurality of pressurized-gas discharge-control valves that are not simultaneously brought into an open state.

2. The injection molding method for producing a molded article having a hollow portion according to claim 1, wherein the volume of each of the measuring tanks is different.

3. The injection molding method for producing a molded article having a hollow portion according to claim 1, wherein when the volume of a measuring tank having the smallest volume is $V_o$, the volume $V_n$ of a measuring tank in an n-th place (n=2, 3 ... N) satisfies $2^{(n-1)}V_o$.

4. The injection molding method for producing a molded article having a hollow portion according to claim 1, wherein the apparatus used for introducing a pressurized gas includes a pressure-regulating valve disposed in the first pressurized-gas supply-line for each measuring tank.

5. The injection molding method for producing a molded article having a hollow portion according to claim 1, wherein the apparatus used for introducing a pressurized gas includes a pressurized-gas accumulation tank having a volume greater than the total volume of the measuring tanks, that is disposed in the first pressurized-gas supply-line between the pressurized-gas supply valve and the pressurized-gas supply-source.

6. The injection molding method for producing a molded article having a hollow portion according to claim 5, wherein the apparatus used for introducing a pressurized gas includes a pressure-regulating valve disposed in the first pressurized-gas supply-line between the pressurized-gas accumulation tank and each of the measuring tanks.

7. The injection molding method for producing a molded article having a hollow portion according to claim 1, wherein the apparatus used for introducing a pressurized gas includes a flow-regulating valve disposed in the second pressurized-gas supply-line for each measuring tank.

8. The injection molding method for producing a molded article having a hollow portion according to claim 1, wherein the pressurized gas is a pressurized nitrogen gas, a pressurized carbon dioxide gas or pressurized air.

9. An injection molding method for producing a molded article having a hollow portion by injecting a molten resin into a cavity provided in a mold and introducing a pressurized gas into the molten resin in the cavity, said method comprising:

provishing an apparatus for introducing a pressurized gas, which comprises:
    a pressurized-gas supply-source;
    a plurality of measuring tanks;
    a first pressurized-gas supply-line connected to the pressurized-gas supply-source;
    a second pressurized-gas supply-line connected to a terminal of the first pressurized-gas supply-line for supplying the pressurized gas to each measuring tank from the pressurized-gas supply-source;
    a third pressurized-gas supply-line connected to the terminal of the first pressurized-gas supply-line that communicates with the second pressurized-gas supply-line and is for introducing the pressurized gas into the molten resin in the cavity from at least one of the measuring tanks;
    a pressurized-gas supply valve disposed in the first pressurized-gas supply-line;
    a pressurized-gas supply/discharge-control valve disposed in the second pressurized-gas supply-line; and
    a pressurized-gas discharge valve disposed in the third pressurized-gas supply-line,
determining a combination of the measuring tanks in advance on the basis of the amount of the pressurized gas to be required for forming the hollow portion in the molded article;
bringing the pressurized-gas discharge valve into a closed state and bringing the pressurized-gas supply/discharge-control valve and the pressurized-gas supply valve into an open state to supply the pressurized gas to the determined combination of measuring tanks, and then bringing the pressurized-gas supply/discharge-control valve and the pressurized-gas supply valve into a closed state;
injecting the molten resin into the cavity provided in the mold; and
bringing the pressurized-gas supply/discharge-control valve disposed in the second pressurized-gas supply-line into an open state on the basis of said determining operation and bringing the pressurized-gas discharge valve into an open state, to introduce the pressurized gas into the molten resin in the cavity for forming the hollow portion, wherein the pressurized-gas supply/discharge control valve includes a plurality of pressurized-gas supply/discharge-control valves that are not simultaneously brought into an open state and the pressurized gas supply source is positioned between the measuring tanks and the mold.

10. The injection molding method for producing a molded article having a hollow portion according to claim 9, wherein the volume of each measuring tank is different.

11. The injection molding method for producing a molded article having a hollow portion according to claim 9, wherein when the volume of a measuring tank having the smallest volume is $V_0$, the volume $V_n$ of a measuring tank in an n-th place (n=2, 3 ... N) satisfies $2^{(n-1)}V_0$.

12. The injection molding method for producing a molded article having a hollow portion according to claim 9, wherein the apparatus used for introducing a pressurized gas includes a pressurized-gas accumulation tank having a volume greater than the total volume of the measuring tanks that is disposed in the first pressurized-gas supply-line between the pressurized-gas supply valve and the pressurized-gas supply-source.

13. The injection molding method for producing a molded article having a hollow portion according to claim 9, wherein the apparatus used for introducing a pressurized gas includes a pressure-regulating valve disposed in the second pressurized-gas supply-line for each measuring tank.

14. The injection molding method for producing a molded article having a hollow portion according to claim 9, wherein the apparatus used for introducing a pressurized gas includes a flow-regulating valve disposed in the second pressurized-gas supply-line for each measuring tank.

15. The injection molding method for producing a molded article having a hollow portion according to claim 9, wherein the pressurized gas is a pressurized nitrogen gas, a pressurized carbon dioxide gas or pressurized air.

* * * * *